United States Patent
Kawahara et al.

(10) Patent No.: US 10,238,960 B2
(45) Date of Patent: Mar. 26, 2019

(54) DUAL INPUT MULTILAYER KEYBOARD

(71) Applicant: MICROSOFT TECHNOLOGY LICENSING, LLC, Redmond, WA (US)

(72) Inventors: Takanori Kawahara, Tokyo (JP); Junnosuke Kuroda, Tokyo (JP); Kohei Hosokawa, Kawasaki (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/497,945

(22) Filed: Apr. 26, 2017

(65) Prior Publication Data

US 2018/0311574 A1   Nov. 1, 2018

(51) Int. Cl.

| | | |
|---|---|---|
| A63F 13/214 | (2014.01) | |
| G06F 3/0488 | (2013.01) | |
| A63F 13/2145 | (2014.01) | |
| G06F 3/0338 | (2013.01) | |
| G06F 3/02 | (2006.01) | |
| A63F 13/24 | (2014.01) | |
| A63F 13/42 | (2014.01) | |

(52) U.S. Cl.
CPC .......... *A63F 13/2145* (2014.09); *A63F 13/24* (2014.09); *A63F 13/42* (2014.09); *G06F 3/0213* (2013.01); *G06F 3/0338* (2013.01); *G06F 3/04883* (2013.01); *G06F 3/04886* (2013.01)

(58) Field of Classification Search
None
See application file for complete search history.

(56) References Cited

U.S. PATENT DOCUMENTS

| | | |
|---|---|---|
| 8,130,203 B2 | 3/2012 | Westerman |
| 8,359,543 B2 | 1/2013 | Sengupta |
| 8,713,464 B2 | 4/2014 | Aides et al. |

(Continued)

FOREIGN PATENT DOCUMENTS

WO   1997018547 A1   5/1997

OTHER PUBLICATIONS

Findlater, et al., "Beyond QWERTY: Augmenting Touch-Screen Keyboards with Multi-Touch Gestures for Non-Alphanumeric Input", In Proceedings of ACM Conference on Human Factors in Computing Systems, May 5, 2012, pp. 2679-2682.

(Continued)

*Primary Examiner* — Damon Pierce
(74) *Attorney, Agent, or Firm* — Shook, Hardy & Bacon LLP

(57) ABSTRACT

Aspects of the technology described herein provide an input mechanism that allows a user to select characters for input to a text area of a computing interface. The technology can be implemented as a virtual keyboard. Selecting a single output for the keyboard requires a user to provide two inputs. Each input is provided with reference to a different layer. Providing the first input to the first layer activates a second layer specific to the key selected with the first input. Each key in the first layer can be associated with a unique second layer. The output (e.g., a character) is determined from the second layer by providing a second input. The combination of the first and second input selects the ultimate output. In one aspect, the first input and the second input only have a directional component.

20 Claims, 16 Drawing Sheets

(56) References Cited

U.S. PATENT DOCUMENTS

| | | |
|---|---|---|
| 8,826,178 B1 | 9/2014 | Zhang |
| 2012/0110494 A1 | 5/2012 | Jun |
| 2012/0206330 A1 | 8/2012 | Cao et al. |
| 2012/0242581 A1 | 9/2012 | Laubach |
| 2012/0306769 A1 | 12/2012 | Zhu et al. |
| 2013/0215037 A1 | 8/2013 | Mao |
| 2014/0329593 A1* | 11/2014 | Akkarakaran .......... A63F 13/42 463/31 |
| 2014/0364222 A1* | 12/2014 | Tanaka ................ G06F 3/04883 463/31 |
| 2015/0277698 A1 | 10/2015 | Pakhchanian |

OTHER PUBLICATIONS

Don, et al., "Applying Bimanual Interaction Principles to Text Input on Multi-Touch Surfaces and Tabletops", In Proceedings of ACM International Conference on Interactive Tabletops and Surfaces, Nov. 7, 2010, pp. 253-254.

* cited by examiner

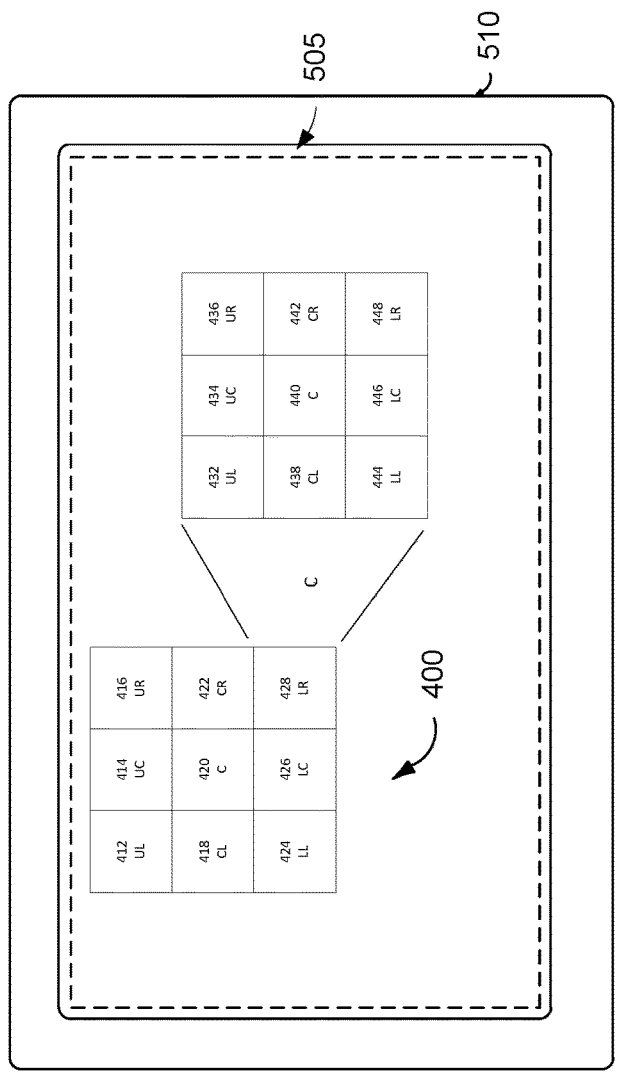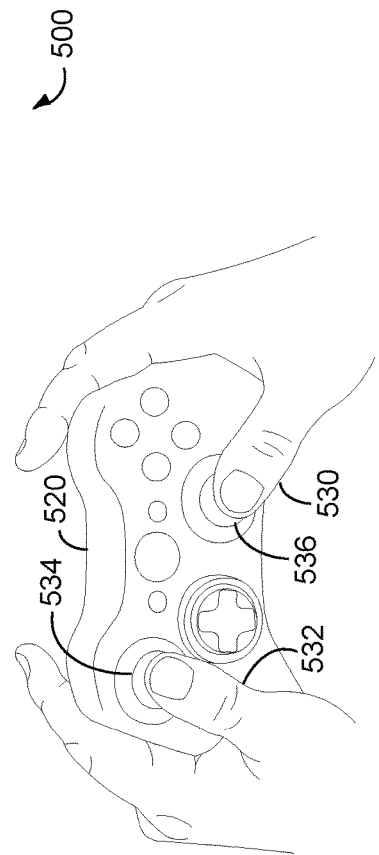
FIG. 5.

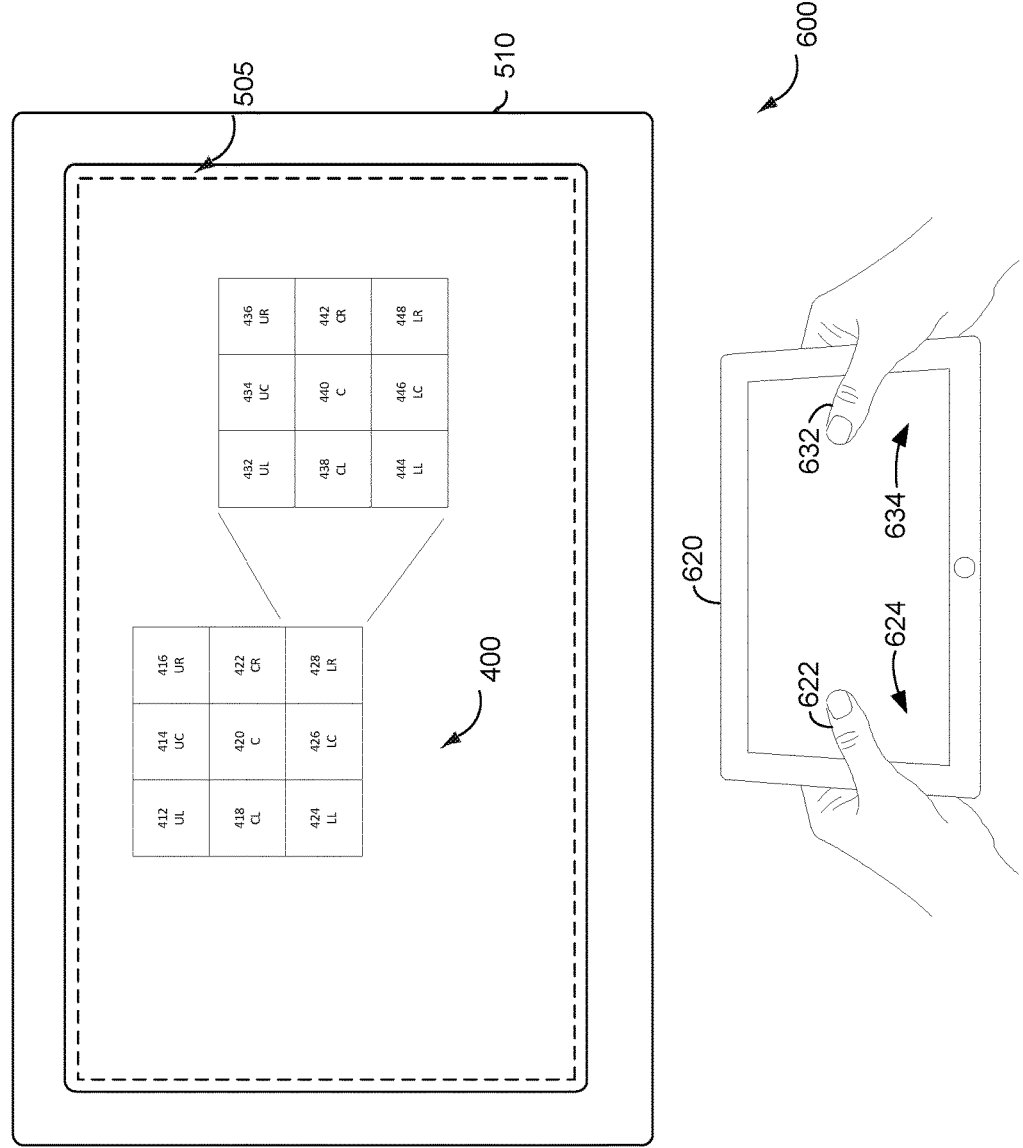

DUAL INPUT MULTILAYER KEYBOARD

BACKGROUND

Many current touchscreen keyboards are very difficult for users to blindly operate, which makes for slower-user input, compared to a hardware keyboard, which users can typically operate without looking at the keys. The lack of tactile feedback on touchscreen keyboards makes it difficult for users to maintain the home position.

Other keyboards that are operated remotely, for example, with a gamepad, require the user to navigate a cursor onto each key for selection. The keyboard may be displayed on a screen upon selection of a text input box.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein provide an input mechanism that allows a user to select characters for input to a text area of a computing interface. The technology can be implemented as a virtual keyboard and can be described as a dual input multilayer keyboard. Selecting a single output for the keyboard requires a user to provide two inputs. In an aspect, one input is made with the left hand and the other the right hand. Each input is provided with reference to a different layer of the keyboard. Providing the first input with reference to the first layer activates a second layer specific to the key from the first layer selected with the first input. Each key in the first layer can be associated with a unique second layer. The output (e.g., a character, letter, and punctuation) is determined from the second layer by providing an additional input when the second layer is active. In other words, the first input does not directly select the keyboard output. Instead, the combination of the first and second input selects the output.

In one aspect, the first input and the second input have a directional component. The first input does not directly interact with a particular hard or soft key in the first layer. For example, a user does not select a key by touching the key directly. Instead, the user provides a directional input by swiping an area of touchscreen in a certain direction, moving a mouse, manipulating a joy stick in a certain direction, making a directional gesture, or providing a directional input through some other mechanism. In this way, the input can be detached from the keyboard. In fact, the keyboard does not need to be displayed once a user masters the directional inputs.

In one aspect, the dual input multilayer keyboard generates a phonetic output. The character output represents a phonetic sound within a language. In some cases, the phonetic sound is generated by combining a consonant sound with a vowel sound. In this case, the first layer can present consonants for selection and the second layer presents vowels to be joined with the selected consonant. Different languages have different valid combinations of valid consonants and vowels and the second layer can show only vowels that forms a valid pair with the selected consonant. In some languages, the consonant/vowel combination is represented by a single character.

BRIEF DESCRIPTION OF THE DRAWINGS

Aspects of the invention are described in detail below with reference to the attached drawing figures, wherein:

FIG. 5 is a diagram of a dual input keyboard implemented on a gamepad, in accordance with an aspect of the technology described herein;

FIG. 6 is a diagram of a dual input keyboard implemented on a tablet and television, in accordance with an aspect of the technology described herein;

DETAILED DESCRIPTION

Figure 1:
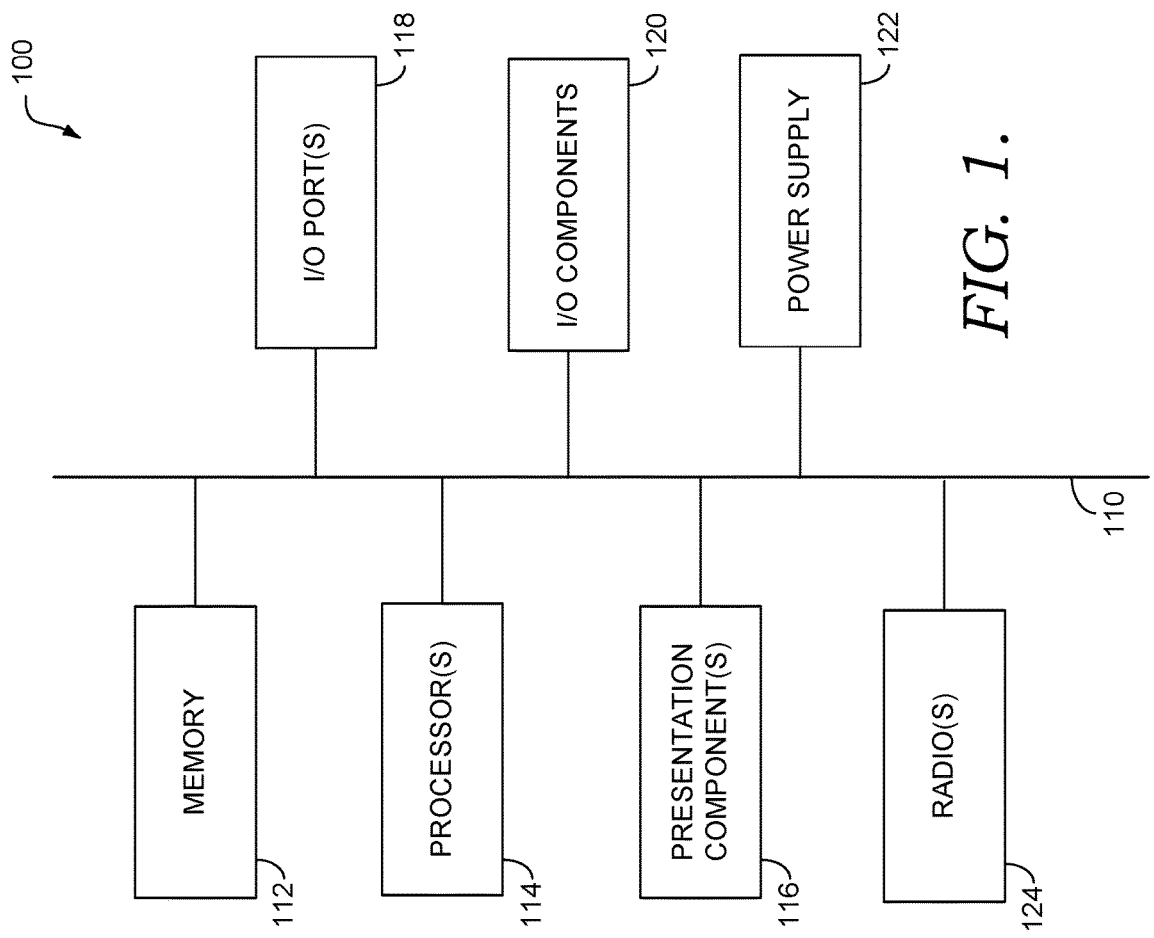
FIG. 1 is a block diagram of an exemplary computing environment suitable for implementing aspects of the technology described herein.

The subject matter of technology described herein is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein provide an input mechanism that allows a user to select characters for input to a text area of a computing interface. The technology can be implemented as a virtual keyboard and can be described as a dual input multilayer keyboard. Selecting a single output for the keyboard requires a user to provide two inputs. In an aspect, one input is made with the left hand and the other the right hand. Each input is provided with reference to a different layer. Providing the first input with reference to the first layer activates a second layer specific to the key selected in the first layer with the first input. Each key in the first layer can be associated with a unique second layer. The output (e.g., a character, letter, and punctuation) is determined from selection of a key in the second layer by providing an additional input. In other words, the first input does not directly select the keyboard output. Instead, the combination of the first and second input selects the output.

In one aspect, the first input and the second input have a directional component. In other words, the first input does not directly interact with a particular hard or soft key in the first layer. Instead, the user provides a directional input by swiping an area of touchscreen in a certain direction, manipulating a joy stick in a certain direction, making a directional gesture, or providing a directional input through some other mechanism. In this way, the input can be detached from the keyboard. In fact, once a user masters the directional inputs the keyboard does not need to be displayed.

In one aspect, the first layer comprises at least nine different selection options arranged in a 3×3 grid. The selection options may be described as keys herein. Each of the selection options is mapped to a different directional input, as will be explained in more detail below. By providing a directional input, one of the nine keys is selected. The second layer can also comprise at least nine different selection options arranged in a 3×3 grid. The nine different selection options in the second layer can be unique to the key selected in the first layer. In the dual 3×3 arrangement, a total of 81 different characters could be selected. It is also possible to add supplemental rows or columns to the first or second layer.

The directional inputs can be described from the perspective of the center key in the core 3×3 grid using a map analogy where the row above the center row is north and the row below the center row is south. Similarly, the row to the right of the center row can be east and the row to the left of the center row west. Alternatively, the rows can be described as upper, center or center, and lower. The columns can be described as right or rightward, center or center, and left or leftward. In this way, a directional input having a north-east direction from start to finish can be mapped to the north-east most key, which is the key in the right most space in the top row. A directional input having only a north component (upward only) would map to the middle key in the top row.

The directions can also be described in terms of right-left and up-down from the perspective of a user viewing the keyboard. A left-to-right directional input without a significant up or downward direction can be mapped to the right most key in the center row.

In one aspect, the dual input multilayer keyboard generates a phonetic output. In other words, the character output represents a phonetic sound within a language, such as Japanese, Chinese, or Korean. In some cases, the phonetic sound is generated by combining a consonant sound with a vowel sound. In this case, the first layer can present consonants for selection and the second layer presents vowels. Different languages have different valid combinations of valid consonants and vowels and the second layer can show only vowels that form a valid pair with the selected consonant. In some languages, the consonant/vowel combination is represented by a single character.

Having briefly described an overlayer of aspects of the technology described herein, an exemplary operating environment suitable for use in implementing aspects of the technology described herein is described below.

Exemplary Operating Environment

Referring to the drawings in general, and initially to FIG. 1 in particular, an exemplary operating environment for implementing aspects of the technology described herein is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 1 and refer to "computer" or "computing device."

Aspects of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Aspects of the disclosure may be practiced in a variety of system configurations, including handheld devices, consumer electronics, general-purpose computers, more specialty computing devices, etc. Aspects of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 1, computing device 100 includes a bus 110 that directly or indirectly couples the following devices: memory 112, one or more processors 114, one or more presentation components 116, one or more input/output (I/O) ports 118, one or more I/O components 120, and an illustrative power supply 122. Bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more aspects of the present disclosure. Distinction is not made between such categories as "workstation," "server," "laptop," "handheld device," etc., as all are contemplated within the scope of FIG. 1 and with reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes, but is not limited to, random access memory ("RAM"), read only memory ("ROM"), electrically erasable programmable read-only memory ("EEPROM"), flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 100. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, radio frequency ("RF"), infrared, and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors 114 that read data from various entities such as memory 112 or I/O components 120. Presentation component(s) 116 presents data indications to a user or other device. Exemplary presentation components include a display device, speaker, printing component, vibrating component, and the like.

The I/O ports 118 allow computing device 100 to be logically coupled to other devices, including I/O components 120, some of which may be built in. Illustrative components include a microphone, joystick, game pad, satellite dish, scanner, printer, wireless device, etc. The I/O components 120 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, red, green, and blue ("RGB") camera systems, and combinations of these, for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Some aspects of computing device 100 may include one or more radio(s) 124 (or similar wireless communication components). The radio 124 transmits and receives radio or wireless communications. The computing device 100 may be a wireless terminal adapted to receive communications and media over various wireless networks. Computing device 100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a wireless local area network ("WLAN") connection using the 802.11 protocol; a Bluetooth connection to another computing device is a second example of a short-range connection, or a near-field communication connection. A long-range connection may include a connection using, by way of example and not limitation, one or more of CDMA, general packet radio surface ("GPRS"), GSM, TDMA, and 802.16 protocols.

Exemplary Gaming Environment

Figure 2:
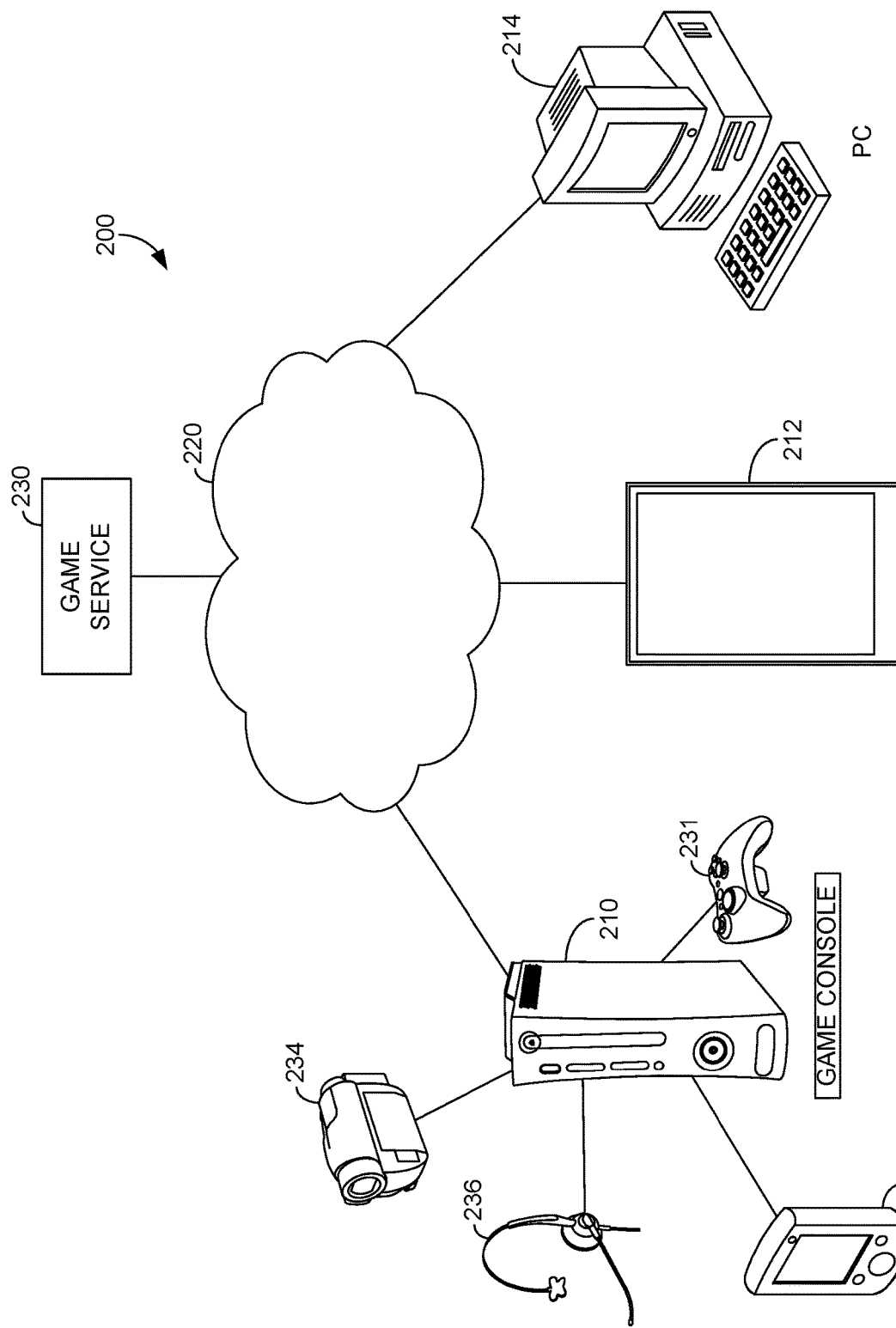
FIG. 2 is a diagram of a gaming environment, in accordance with an aspect of the technology described herein.

Turning now to FIG. 2, a gaming environment 200 is shown, in accordance with an aspect of the technology described herein. As mentioned, aspects of the technology described herein may use a gamepad or other input device to generate the dual inputs needed to select characters through a keyboard. The gaming environment 200 comprises various game clients connected through a network 220 to a game service 230. Exemplary game clients include a game console 210, a touchscreen device 212, and a personal computer 214. Use of other game clients, such as smart phones, are also possible. The software that enables the keyboard described herein can run on a client device or on a server. The game console 210 may have one or more game controllers communicatively coupled to it. In one aspect, the touchscreen device 212 may act as an input device for a game console 210 or a personal computer 214 using the dual input keyboard. Network 220 may be a wide area network, such as the Internet.

The controllers associated with game console 210 include game pad 231, tablet 232, headset 236, and depth camera 234. The game pad 231 may be capable of generating basic control signals, such as those generated by button selections and joy stick movement. Movement data such as that generated by accelerometers and gyros within the game pad 231 are also control inputs.

Tablet 232 is shown coupled directly to the game console 210, but the connection could be indirect through the Internet or a subnet. In one aspect, the game service 230 helps make a connection between the tablet 232 and touchscreen device 212 and the game console 210. The tablet 232 is capable of generating numerous input streams and may also serve as a display output mechanism. In addition to being a primary display, the tablet 232 could provide supplemental game information related to information shown on a primary display coupled to the game console 210, or simply be a control surface. The input streams generated by the tablet 232 include video and picture data, audio data, movement data, touch screen data, and keyboard input data. The dual input keyboard could be displayed on the tablet 232 and a left and right input received through the tablet 232.

The headset 236, captures audio input from a player and the player's surroundings and may also act as an output device if it is coupled with a headphone or other speaker.

The depth camera 234 generates a depth cloud used as a control input. The depth camera 234 may use an infrared camera to determine a depth or distance from the camera for each pixel captured. Stereoscopic depth cameras are also possible. In addition, the depth camera 234 may capture a typical color stream or picture. The depth camera 234 may have several image gathering components. For example, the depth camera 234 may have multiple cameras. Various combinations of components shown in FIG. 2 can generate a dual input keyboard.

Game service 230 may comprise multiple computing devices communicatively coupled to each other. In one aspect, the game service 230 is implemented using one or more data centers. The data centers may be spread out across various geographic regions including cities throughout the world. In this scenario, the game clients may connect to the closest data centers. Aspects of the technology described herein are not limited to this setup.

The game service 230 allows the game to be executed within the computing devices provided by the game service 230. A communication session between the game service and game clients carries input traffic to the game service 230 and can return a rendered game image and/or other game output.

Exemplary Game Environment

Figure 3:
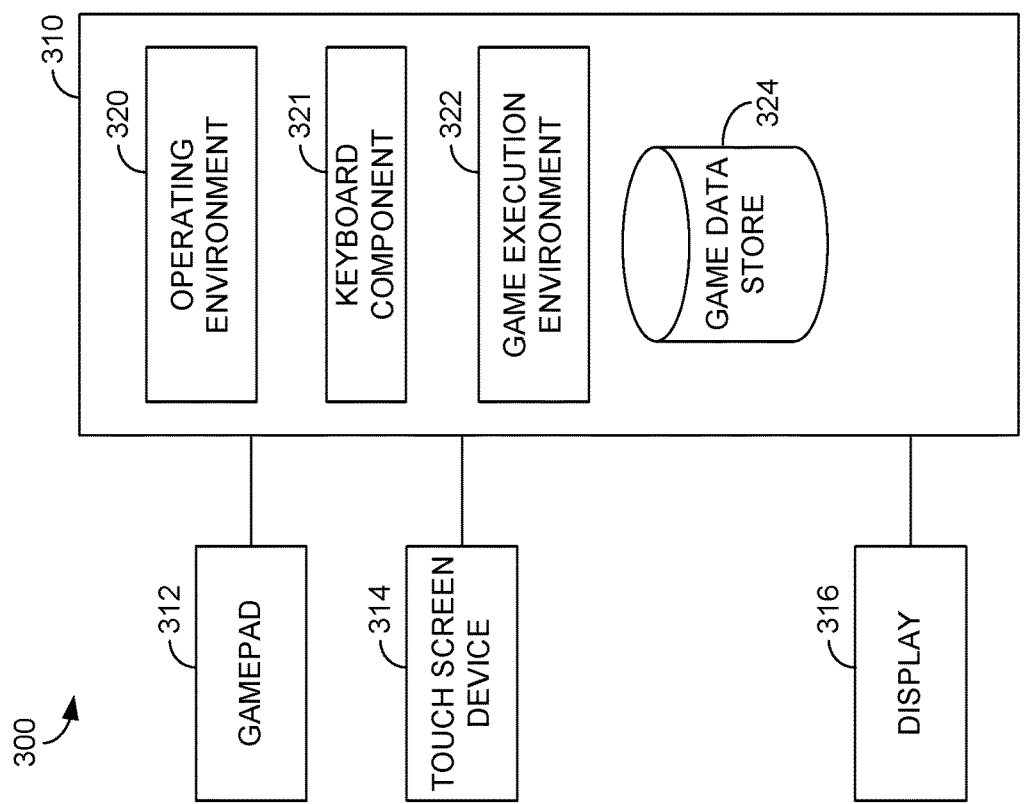
FIG. 3 is a diagram of a remote computing environment for gaming, in accordance with an aspect of the technology described herein.

Turning now to FIG. 3, an exemplary gaming environment 300 is shown, in accordance with an aspect of the technology described herein. The gaming environment 300 is just one environment where the dual input multilayer keyboard can be implemented. The technology described herein can be used with a gamepad. The gaming environment 300 includes a gaming device 310. The gaming device 310 is connected to a gamepad 312, a touchscreen device 314, and a display 316. Other game input devices may be used with the gaming device 310, including keyboards, a mouse, a touch pad, a touchscreen, a microphone for receiving voice commands, a depth camera, a video camera, and a trackball. Aspects of the technology described herein are not limited to these input devices. The display 316 is capable of displaying video game content. For example, the display 316 may be a television or computer screen.

The touchscreen device 314 runs an interface program that can process directional input into the dual input multilayer keyboard. The keyboard can be output for display on the touchscreen device or the touchscreen device 314 can be used for input only. For example, the keyboard could be output for display on the display 316 and the touchscreen device 314 used for input only. The virtual control interface program allows the touchscreen device 314 to output a suitable keyboard interface for display, in some aspects. The virtual control interface program may translate the directional inputs received through the touchscreen into functional commands understood by a gaming device, and/or by a keyboard component 321 on the gaming device. For example, a swipe could be classified into a direction and communicated to the gaming device 310, rather than communicating the touch data. In other implementations, the touch data from a swipe is communicated to the game device 310 and interpreted by the game device 310. Controls can be translated into an appropriate format as needed for consumption by the device running the dual input multilayer keyboard.

The gaming device 310 is a computing device that is able to execute video games. The gaming device 310 could be laptop computer or a game console. The gaming device 310 includes an operating environment 320, a dual input multilayer keyboard component 321, a game execution environment 322, and a game data store 324. Other components of the gaming device 310 are not shown for the sake of simplicity.

The operating environment 320 may be provided by an operating system that manages the hardware and provides services to applications running on the gaming device 310. The operating environment may allocate client resources to different applications as part of game and communication functions.

The game data store 324 stores downloaded games, game samples, and/or partially downloaded games. Games may be downloaded in playable blocks. To play a game, the game may need to be loaded from the game data store 324 into active memory associated with the game execution environment 322. The game data store 324 may also store player progress files. The game data store 324 can also store player or user preferences that can be applicable to the dual input multilayer keyboard.

The game execution environment 322 comprises the gaming resources on the device 310 required to execute instances of a game. The game execution environment 322 comprises active memory along with computing and video processing resources. The game execution environment 322 receives gaming controls and causes the game to be manipulated and progressed according to game programming. In one aspect, the game execution environment 322 outputs a rendered video stream that is communicated to the display 316.

The dual input multilayer keyboard component 321 can enable the gaming device to implement a dual input multilayer keyboard. The keyboard can be output for display on the display component 316 by the keyboard component 321. The keyboard component can receive directional inputs from gamepad 312 or touchscreen device 314 and map the directional inputs to a key in the first and second layer. The keyboard component 321 can input a selected character from the second layer into an active text field within an application running on the gaming device 310. For example, the character can be input into a video game text field, a browser text field, a spreadsheet, a document, a media streaming application, for example, in a search box. The functions of the keyboard component are explained in more detail with reference FIGS. 14, 15 and 16.

Figure 4:
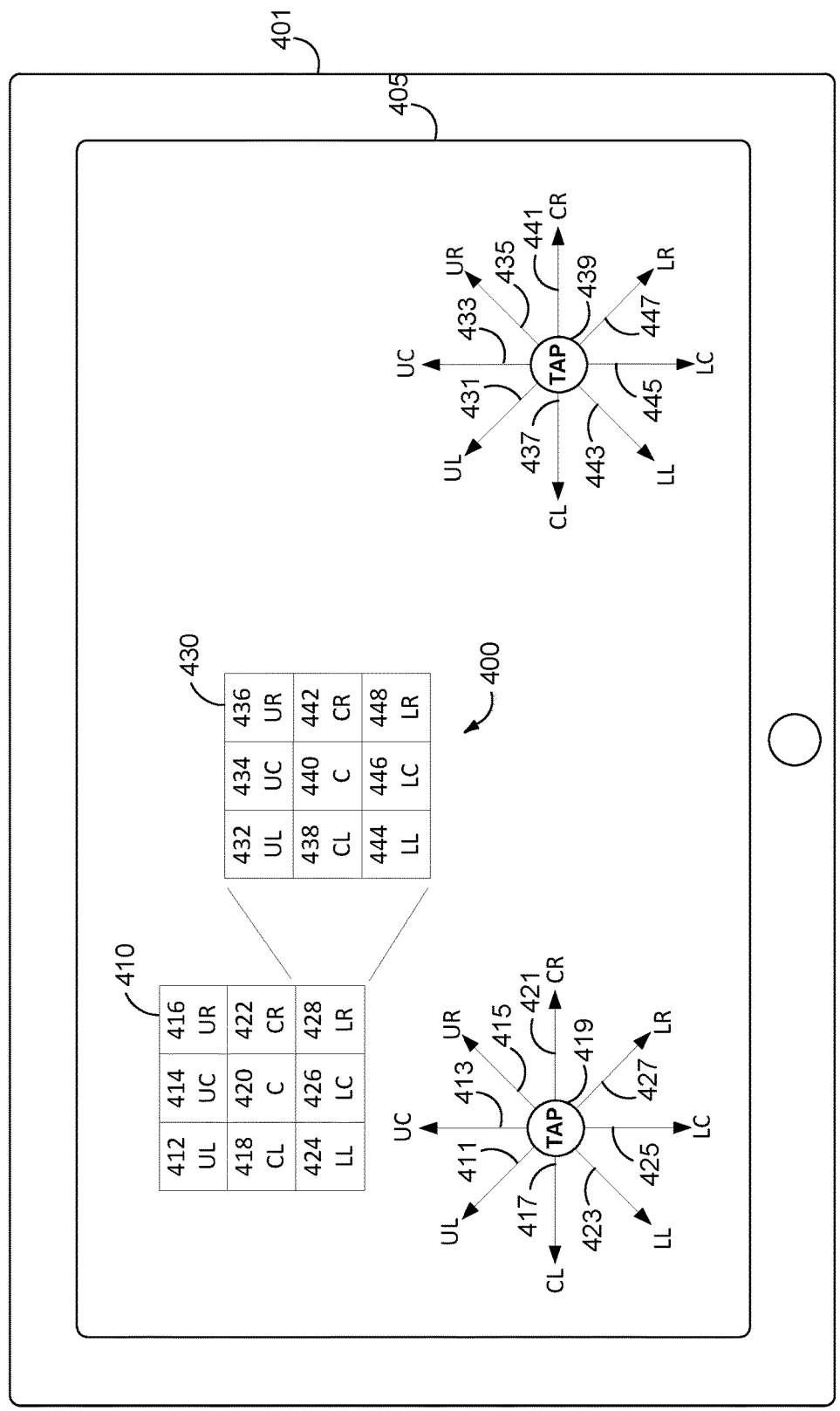
FIG. 4 is a diagram of a dual input keyboard implemented on a tablet, in accordance with an aspect of the technology described herein.
Figure 8:
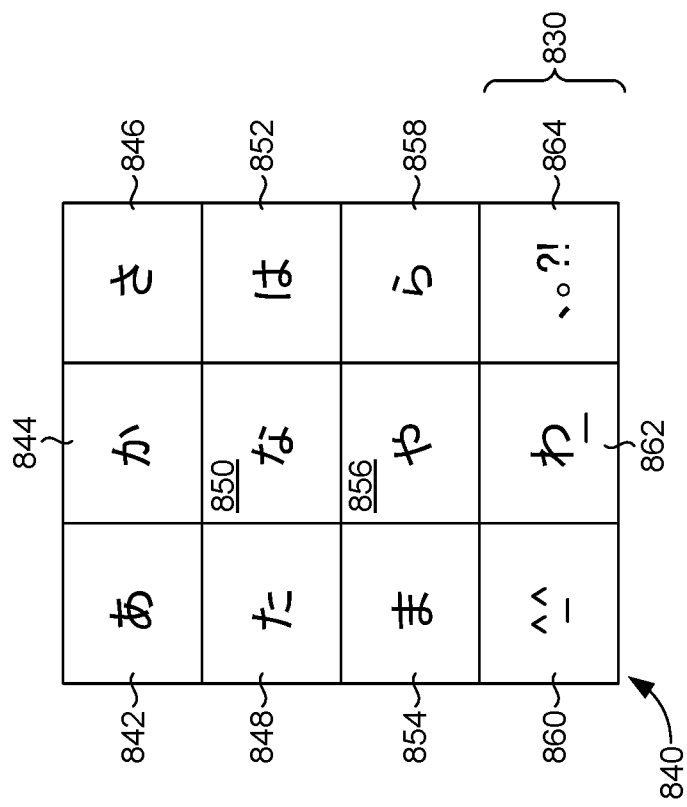
FIG. 8 is a diagram of a dual input keyboard configured as a Japanese Keitai keyboard showing a first input layer, in accordance with an aspect of the technology described herein.
Figure 9:
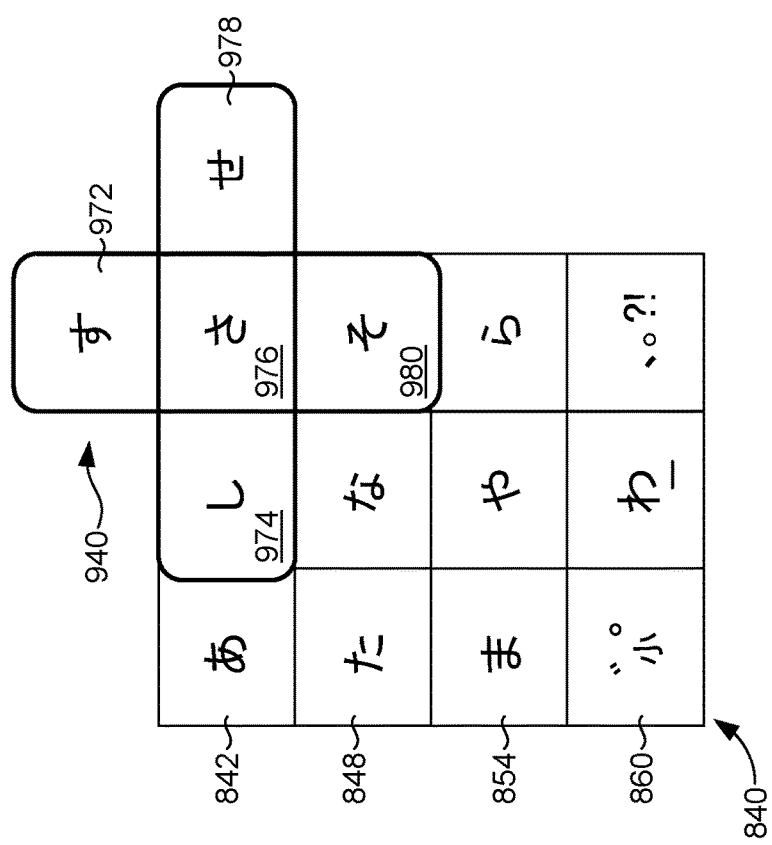
FIG. 9 is a diagram of a dual input keyboard configured as a Japanese Keitai keyboard showing a second input layer, in accordance with an aspect of the technology described herein.

Turning now to FIG. 4, the keys on both layers of a dual input multilayer keyboard 400 are illustrated along with the directional inputs that activate the keys, in accordance with an aspect of the technology described herein. The keyboard 400 is shown on a touchscreen tablet 401 comprising a touchscreen 405. The touchscreen 405 can act as both a display for the keyboard 400 and an input mechanism. As mentioned and illustrated subsequently, the input mechanism and the display mechanism for the dual input keyboard can be different devices or the same device. The keys are shown without characters for the sake of simplicity in FIG. 4. Different groups of characters can be displayed in actual implementations of the keyboard, such as shown in FIGS. 7-9. The purpose of FIG. 4 is to define labels used to describe keys in the keyboard as well as the directional input that corresponds to each key. Accordingly, in an actual implementation, the labels such as "UL" (meaning upper-left) would not need to be displayed. Instead, character(s) activated by selection of a key would be shown.

FIG. 4 shows a first layer 410 and a second layer 430 of a dual input multilayer keyboard. As can be seen, both layers include nine keys arranged in a 3×3 grid. In other words, each layer includes three rows of three keys and three columns of three keys for a total of nine keys. From the perspective of the viewer, there is an upper row, a center row, and a lower row. There is also a left column, a center column, and a right column.

The top row of the first layer 410 includes upper-left key 412, upper-center key 414, and upper-right key 416. The center row of the first layer 410 includes center-left key 418, center key 420, and center-right key 422. The lower row of the first layer 410 includes lower-left key 424, lower-center key 426 and lower-right key 428.

In an aspect, different sources of directional input are provided for each layer. In the example shown, swipes provided on the left-hand side of the touchscreen 405 are mapped to the first layer 410 and swipes provided on the right-hand side of the touchscreen 405 are mapped to the second layer 430. In the example shown, eight different directional inputs are available along with a tap for a total of nine different inputs. Each input is mapped to a key on the keyboard.

Keys in the first layer 410 are mapped to swipes provided on the left-hand side of the touchscreen 405. A tap 419 maps to the center key 420. The remaining directional inputs map to keys from the perspective of the center key 420. The tap can be executed by a single or double tap of the touchscreen 405. In a gamepad, mouse, or other input scenario, a button can be used to generate a tap.

An upper-left swipe 411 maps to the upper-left key 412. The upper-left swipe 411 is defined by an input (e.g., a swipe on the touchscreen) having an upward directional component and a leftward directional component.

An upper-center swipe 413 maps to the upper-center key 414. The upper-center swipe 413 is defined by an input (e.g., a swipe on the touchscreen) having an upward directional component without a rightward or leftward directional component.

Whether an individual input has a leftward or rightward component is determined by comparison to thresholds that define the directions. It may be impossible for a user to provide an input that is directly upward. Accordingly, an input without rightward or leftward components means an input not meeting the rightward or leftward threshold. In an aspect, there is a threshold that divides an upward-center input from an upward-rightward threshold. On one side of the threshold the input is classified as upper-left and in the other upper-center. It can be the same with all of the other directional classifications. For example, the threshold can be used to classify an input as upward, downward, or center.

In one aspect, the thresholds are user specific. The technology described herein can provide a tuning or customization interface that allows a user to go through a series of swipes. For example, a user may be asked to make each possible swipe three times. The average vector for each of these three swipes for a particular input can be used as the default baseline. The thresholds can then be set to the middle point between the new baseline vectors that define a typical swipe for an individual user.

Continuing with the mapping of directional inputs to keys, an upper-rightward swipe 415 maps to the upper-right key 416. The upper-rightward swipe 415 is defined by an input (e.g., a swipe on the touchscreen) having an upward directional component and a rightward directional component.

A center-leftward swipe 417 maps to the center-left key 418. The center-leftward swipe 417 is defined by an input (e.g., a swipe on the touchscreen) having neither an upward or downward directional component and a leftward directional component. As mentioned, whether an input has an upward or downward component depends on meeting a threshold. Thus, an input with no upward or downward component does not need to be level, however, it cannot have more than a threshold amount of upward or downward movement to be classified as level.

A center-rightward swipe 421 maps to the center-right key 422. The center-rightward swipe 421 is defined by an input (e.g., a swipe on the touchscreen) having neither an upward or downward directional component and a rightward directional component.

A lower-left swipe 423 maps to the lower-left key 424. The lower-left swipe 423 is defined by an input (e.g., a swipe on the touchscreen) having a downward directional component and a leftward directional component.

A lower-center swipe 425 maps to the lower-center key 426. The lower-center swipe 425 is defined by an input (e.g., a swipe on the touchscreen) having a downward directional component without a rightward or leftward directional component.

A lower-right swipe 427 maps to the lower-right key 428. The lower-right swipe 427 is defined by an input (e.g., a swipe on the touchscreen) having a downward directional component and a rightward directional component.

When a key within the first layer is selected a second layer becomes active and may be displayed. Subsequent inputs are then mapped to the second layer. In one aspect, different types of inputs are associated with the first and second layer. For example, swipes on the right side of the touchscreen 405 can be associated with the second layer. In the example shown, the second layer 430 is activated upon selection of the lower-right key 428 with a lower-right swipe 427. Keys in the second layer 430 are mapped to swipes provided on the right-hand side of the touchscreen 405. The tap 439 is mapped to the center key 440. The remaining directional inputs map to keys from the perspective of the center key 440.

An upper-left swipe 431 maps to the upper-left key 432. The upper-left swipe 431 is defined by an input (e.g., a swipe on the touchscreen) having an upward directional component and a leftward directional component.

An upper-center swipe 433 maps to the upper-center key 434. The upper-center swipe 433 is defined by an input (e.g., a swipe on the touchscreen) having an upward directional component without a rightward or leftward directional component.

An upper-rightward swipe 435 maps to the upper-rightward key 436. The upper-rightward swipe 435 is defined by an input (e.g., a swipe on the touchscreen) having an upward directional component and a rightward directional component.

A center-leftward swipe 437 maps to the center-leftward key 438. The center-leftward swipe 437 is defined by an input (e.g., a swipe on the touchscreen) having neither an upward or downward directional component and a leftward directional component.

A center-rightward swipe 441 maps to the center-rightward key 442. The center-rightward swipe 441 is defined by an input (e.g., a swipe on the touchscreen) having neither an upward or downward directional component and a rightward directional component.

A lower-left swipe 443 maps to the lower-left key 444. The lower-left swipe 443 is defined by an input (e.g., a swipe on the touchscreen) having a downward directional component and a leftward directional component.

A lower-center swipe 445 maps to the lower-center key 446. The lower-center swipe 445 is defined by an input (e.g., a swipe on the touchscreen) having a downward directional component without a rightward or leftward directional component.

A lower-right swipe 447 maps to the lower-right key 448. The lower-right swipe 447 is defined by an input (e.g., a swipe on the touchscreen) having a downward directional component and a rightward directional component.

Turning now to FIG. 5, the use of a gamepad 520 to provide input signals for a dual input multilayer keyboard 400 is shown, in accordance with an aspect of technology described herein. The arrangement 500 in FIG. 5 comprises a gamepad 520 in communication with a device that generates a user interface 505 on a display 510 that displays the keyboard 400 described previously. The display 510 may be a television. The keyboard 400 may be generated by the display 510 or by a separate computing device in communication with the display 510. For example, the keyboard 400 could be generated by a game console, DVD player, laptop, DVR, or other computing device. When the keyboard 400 is generated by a device other than the display 510, then the gamepad is in communication with the device. The communication may be a directed wired connection or a direct wireless connection. The communication could be indirect, for example, through a local router.

Input may be provided through the left joy stick 534 and the right joy stick 536. In one aspect, the first input is provided by the user manipulating the left joy stick 534 with the user's left thumb 532. The second input for the second layer can be provided by the right thumb moving the right joy stick 536.

Movement of the joy stick can correspond to the swipes described previously. For example, moving the right joy stick 536 in a rightward direction can correspond to the center-rightward swipe 441 described previously. The tap can be provided by pushing a button such as the left or right bumper (not shown).

It is possible to generate input with the gamepad other than with the joy sticks. For example, game pads or game controllers that are motion sensitive may allow a user to make gestures by moving the entire game pad or game controller in a direction. For example, moving the game controller upward may constitute an upper-center input that corresponds to the upper-center swipe 433 described previously.

Turning now to FIG. 6, implementation 600, a dual input multilayer keyboard 400 displayed on a display device 510 and controlled by a tablet 620, is shown according to aspects of the technology described herein. The keyboard 400 may be generated by the display 510 or by a separate computing device in communication with the display 510. For example, the keyboard 400 could be generated by a game console, DVD player, laptop, DVR, or other computing device. When the keyboard 400 is generated by a device other than the display 510, then the gamepad is in communication with the device. The communication may be a directed wired connection or a direct wireless connection. The communication could be indirect, for example, through a local router. Input can be provided by swiping the left side 624 of the tablet 620 or the right side 634 of the tablet 620 as described previously with reference to FIG. 4.

Figure 7A:
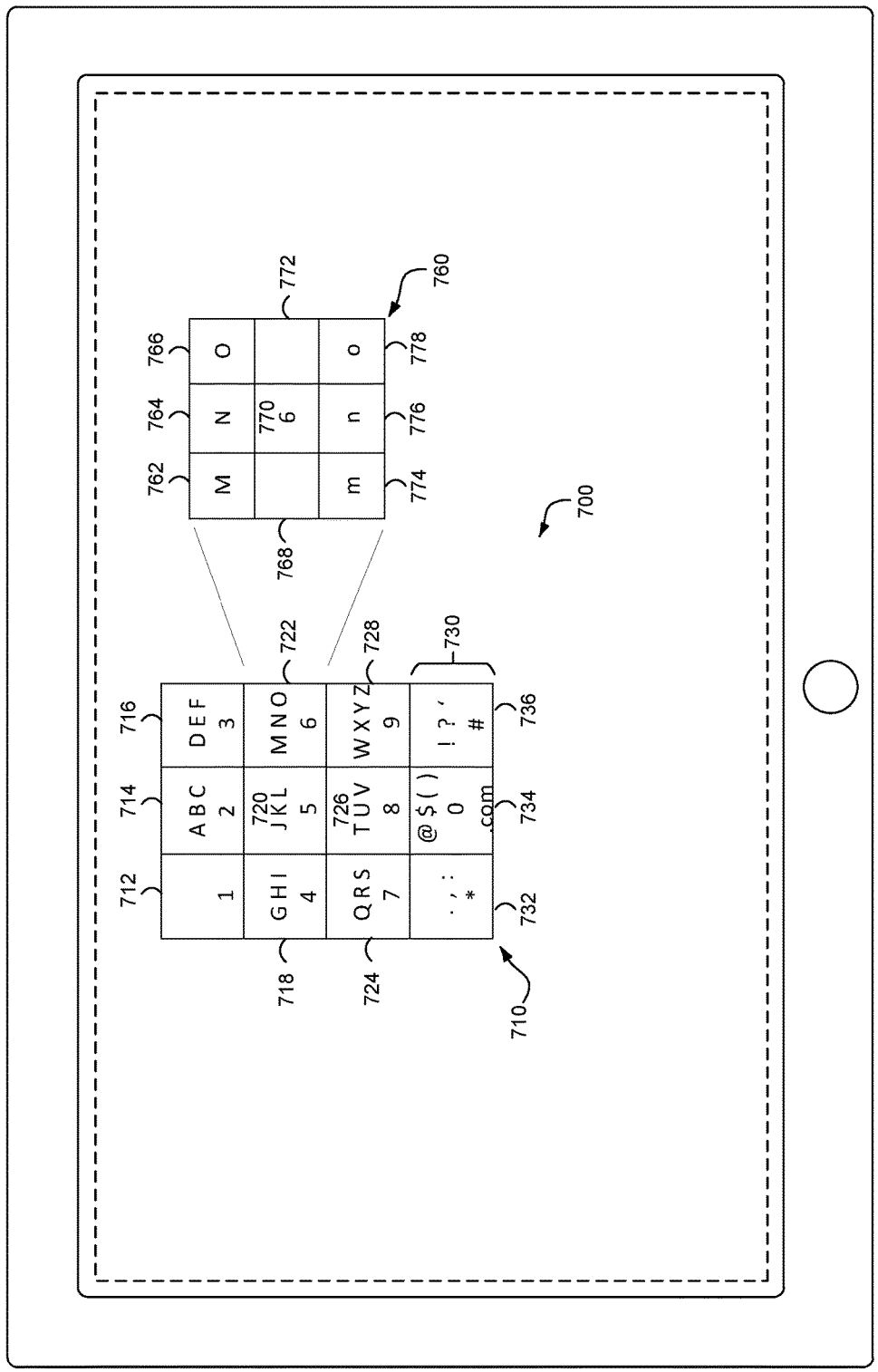
FIG. 7a is a diagram of a dual input keyboard implemented as an English language keypad and showing a second layer activated by selection of a center-right key in the first layer, in accordance with an aspect of the technology described herein.

Turning now to FIG. 7a, an English-language arrangement of a dual touch multilayer keyboard is provided. The second layer 760 is activated upon selection of the center-right key 722. As can be seen, the second layer 760 comprises nine keys arranged in a 3×3 grid. In other words, the second layer 760 includes three rows of three keys and three columns of three keys for a total of nine keys. From the perspective of the viewer, there is an upper row, a center row, and a lower row. There is also a left column, a center column, and a right column.

The first layer 710 includes four rows of three keys each. The first three rows from the top comprise a 3×3 grid forms the core keys that can map to the inputs described previously with reference to FIG. 4. Aspects of the technology described herein can include supplementary rows and columns located adjacent to the core keys. The first layer 710 includes a supplemental row 730 located below the core 3×3 grid.

However, the first layer 710 comprises a supplemental row 730 with three additional keys. Selecting the keys in the supplemental row 730 requires a different type of input then described previously. In one aspect, the keys in first three rows are selected with single finger swipes on a touchscreen, and the keys in the supplemental row 730 are selected with double finger swipes. In another aspect, a button may be used to activate an additional row or column (not shown), such as the supplemental row 730. For example, a button on a gamepad may be associated with the supplemental row 730. The fourth row may be displayed with a color that corresponds to the button on the gamepad that activates the row. For example, the keys in the supplemental row 730 may be displayed in a blue color that contrasts with the color of keys in the first three rows. Pressing a blue button on a gamepad will cause the next directional input to be directed to one of the three keys in the supplemental row 730. For example, a downward input received after selecting the blue button can be mapped to the 734 key, a leftward and downward input after selection of the blue button can be mapped to the 732 key, and a rightward and downward input after selection of the blue button can be mapped to the 736 key.

In one aspect, a three key row can be presented above the core gird shown and associated with a different color button. Similarly, columns comprising three keys could be presented on the left-hand or right-hand side of the core grid. Each column or row can be activated by a different color button and associated with directional input described previously, except the input map to keys one row up or down or one column over. When the keyboard 700 is used with a touchscreen, interfaces can be displayed near the swipe input area to activate a supplementary row or column. In one aspect, a two finger swipe maps to the supplementary row or column and a single finger swipe maps to the core 3×3 grid.

The top row of the first layer 710 includes upper-left key 712, upper-center key 714, and upper-right key 716. The center row of the first layer 710 includes center-left key 718, center key 720, and center-right key 722. The lower row of the first layer 710 includes lower-left key 724, lower-center key 726, and lower-right key 728. The supplemental row 730 includes supplemental lower-left key 732, supplemental lower-center key 734, and supplemental lower-right key 736.

Each key in the first layer 710 depicts a character or characters that may be selected through a second layer that is activated upon selection of a key in the first layer 710. As will be seen, more characters than those shown on a key in the first layer 710 may be accessible through the second layer that is displayed in response to selection of a key in the first layer 710. The upper-left key 712 depicts the number one. The upper-center key 714 depicts the number two and the letters A, B, and C. The upper-right key 716 depicts the number three and the letters D, E, and F. The center-left key 718 depicts the number four and the letters G, H, and I. The center key 720 depicts the number five and the letters J, K, and L. The center-right key 722 depicts the number six and the letters M, N, and O. The lower-left key 724 depicts the number seven and the letters Q, R, and S. The lower-center key 726 depicts the number eight and the letters T, U, and V. The lower-right key 728 depicts the number nine and the letters W, X, Y, and Z. The supplemental lower-left key 732 depicts a period, a comma, a colon, and an asterisk. The supplemental lower-center key 734 depicts an at symbol "@", a dollar sign, an open parenthesis, a closed parenthesis, the number zero, and ".com." The supplemental lower-right key 736 depicts an exclamation mark, a question mark, an apostrophe, and a pound sign.

The second layer 760 is activated upon selection of the center-right key 722. For example, a user may provide a directional input with a rightward directional component to select the center-right key 722, as described previously. The second layer 760 comprises nine keys. The top row of the second layer 760 includes upper-left key 762, upper-center key 764, and upper-right key 766. The center row of the second layer 760 includes center-left key 768, center key 770, and center-right key 772. The lower row of the second layer 760 includes lower-left key 774, lower-center key 776, and lower-right key 778. The second layer 760 does not include a supplemental row or column, but supplemental columns may also be used in the second layer of keyboards that are consistent with the technology described herein. Notice that keys 768 and 772 are blank. This illustrates that positions within the second layer keyboard may go unused in aspects. In some aspects, positions in the first layer may also be blank.

Directional inputs are used to select the various keys. Upon receiving directional input that maps to the upper-left key 762, a capital letter M would be output to an active text interface. Upon receiving directional input that maps to the upper-center key 764, a capital letter N would be output to an active text interface. Upon receiving directional input that maps to the upper-right key 766, a capital letter O would be output to an active text interface. Upon receiving an input that maps to the center key 770, the number 6 would be output to an active text interface. Upon receiving directional input that maps to the lower-left key 774, a lowercase letter "m" would be output to an active text interface. Upon receiving directional input that maps to the lower-center key 776, a lowercase letter "n" would be output to an active text interface. Upon receiving directional input that maps to the lower-right key 778, a lowercase letter "o" would be output to an active text interface.

Figure 7B:
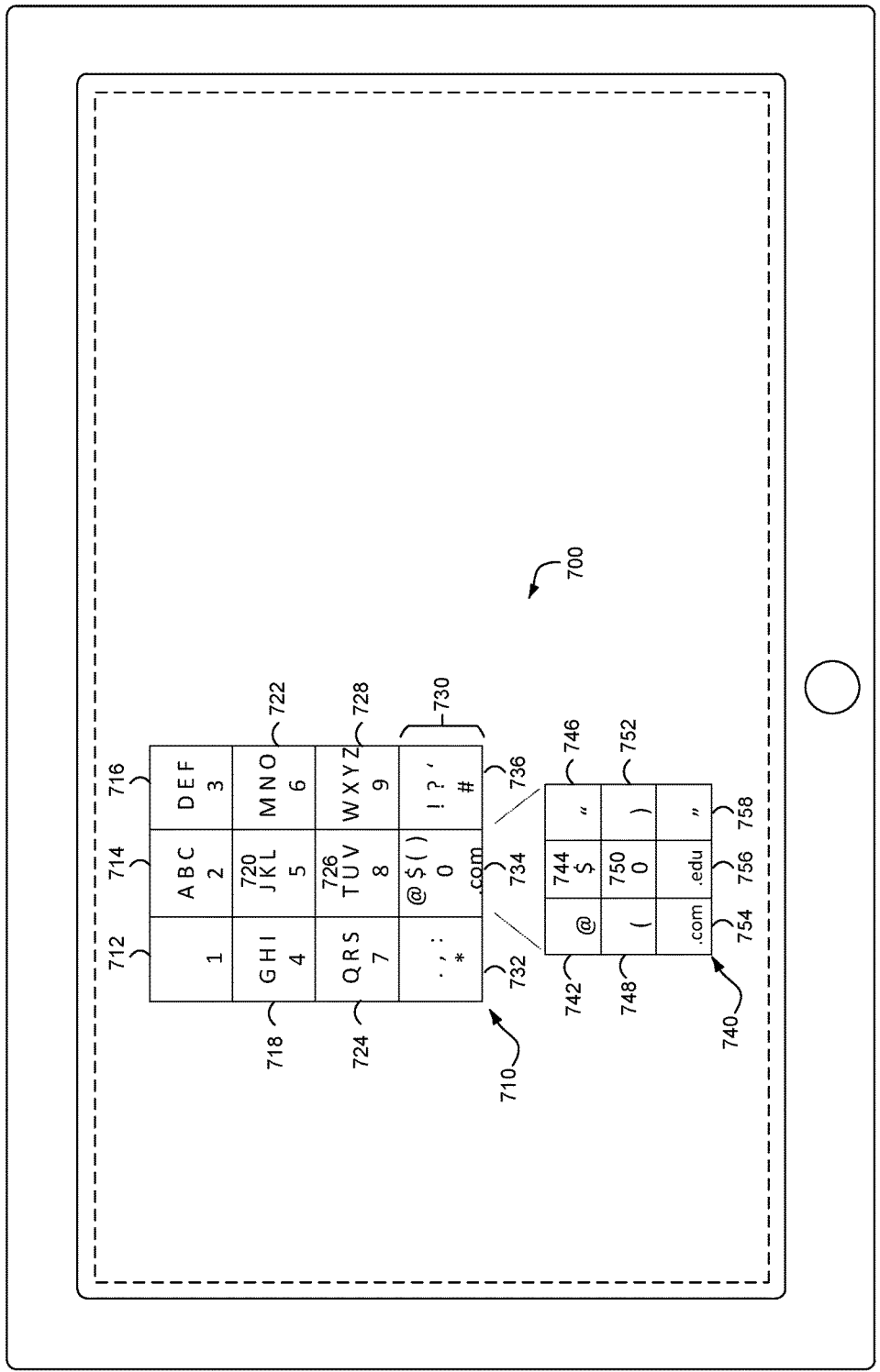
FIG. 7b is a diagram of a dual input keyboard implemented as an English language keypad and showing a second layer activated by selection of a bottom-center key in the first layer, in accordance with an aspect of the technology described herein.

Turning now to FIG. 7b, a second layer 740 activated in response to selection of supplemental lower-center key 734 is shown, according to aspects of the technology described herein. The second layer 740 is activated upon selection of the supplemental lower-center key 734. For example, a user may provide a directional input with a rightward directional component to select the supplemental lower-center key 734, as described previously. The second layer 740 comprises nine keys. The top row of the second layer 740 includes upper-left key 742, upper-center key 744, and upper-right key 746. The center row of second layer 740 includes center-left key 748, center key 750, and center-right key 752. The lower row of the second layer 740 includes lower-left key 754, lower-center key 756, and lower-right key 758. The second layer 740 does not include a supplemental row or column, but supplemental columns may also be used in the second layer of keyboards that are consistent with the technology described herein. Notice that keys 746, 756, and 758 depict characters that are not shown on key 734. This illustrates that characters may be presented for selection in a second layer that are not shown on a selected key in the first layer.

Directional inputs are used to select the various keys. Upon receiving directional input that maps to the upper-left key 742, an "@" would be output to an active text interface. Upon receiving directional input that maps to the upper-center key 744, a dollar sign would be output to an active text interface. Upon receiving directional input that maps to the upper-right key 746, open quotation marks would be output to an active text interface. Upon receiving directional input that maps to the center-left key 748, an open parenthesis would be output to an active text interface. Upon receiving an input that maps to the center key 750, the number 0 would be output to an active text interface. Upon receiving directional input that maps to the center-right key

752, a closed parenthesis would be output to an active text interface. Upon receiving directional input that maps to the lower-left key 754, the web extension ".com" would be output to an active text interface. Upon receiving directional input that maps to the lower-center key 756, the web extension ".edu" would be output to an active text interface. Upon receiving directional input that maps to the lower-right key 758, closed quotation marks would be output to an active text interface.

Turning now to FIG. 8, an implementation of a Japanese language keyboard on a first layer is depicted, according to the technology described herein. In one aspect, the dual input multilayer keyboard generates a phonetic output. The character output represents a phonetic sound within a language, such as Japanese, Chinese, or Korean. In some cases, the phonetic sound is generated by combining a consonant sound with a vowel sound. In this case, the first layer can present consonants for selection and the second layer presents vowels. Different languages have different valid combinations of valid consonants and vowels and the second layer can show only vowels that forms a valid pair with the selected consonant. In some languages, the consonant/vowel combination is represented by a single character.

The implementation shown in FIG. 8 includes a supplemental bottom row. The top row of the first layer 840 includes upper-left key 842, upper-center key 844, and upper-right key 846. The center row of the first layer 710 includes center-left key 848, center key 850, and center-right key 852. The lower row of the first layer 840 includes lower-left key 854, lower-center key 856, and lower-right key 858. The supplemental row 830 includes supplemental lower-left key 860, supplemental lower-center key 862, and supplemental lower-right key 864. All keys except keys 860 and 864 depict consonants. Selection of any of these keys will activate a second layer where a character representing a vowel/consonant combination can be selected. Keys 860 and 864 activate second layers through which punctuation can be selected. As before, directional inputs are used to select each of the keys in the first layer 840.

Turning now to FIG. 9, a second layer 940 Japanese language keyboard is depicted, according to aspects of the technology described herein. The second layer 940 comprises an upper-center key 972, a center-left key 974, center key 976, a center-right key 978, and a lower-center key 980. The keys depict a character in the Japanese language that represents the combination of a vowel with the consonant selected in the first layer. Notice that several of the characters shown in the second layer 940 are not depicted in the first layer. Also notice that several slots in the 3×3 grid described previously are not used. Directional input can be used to select the keys in the second layer 940 as described previously.

Figure 10:
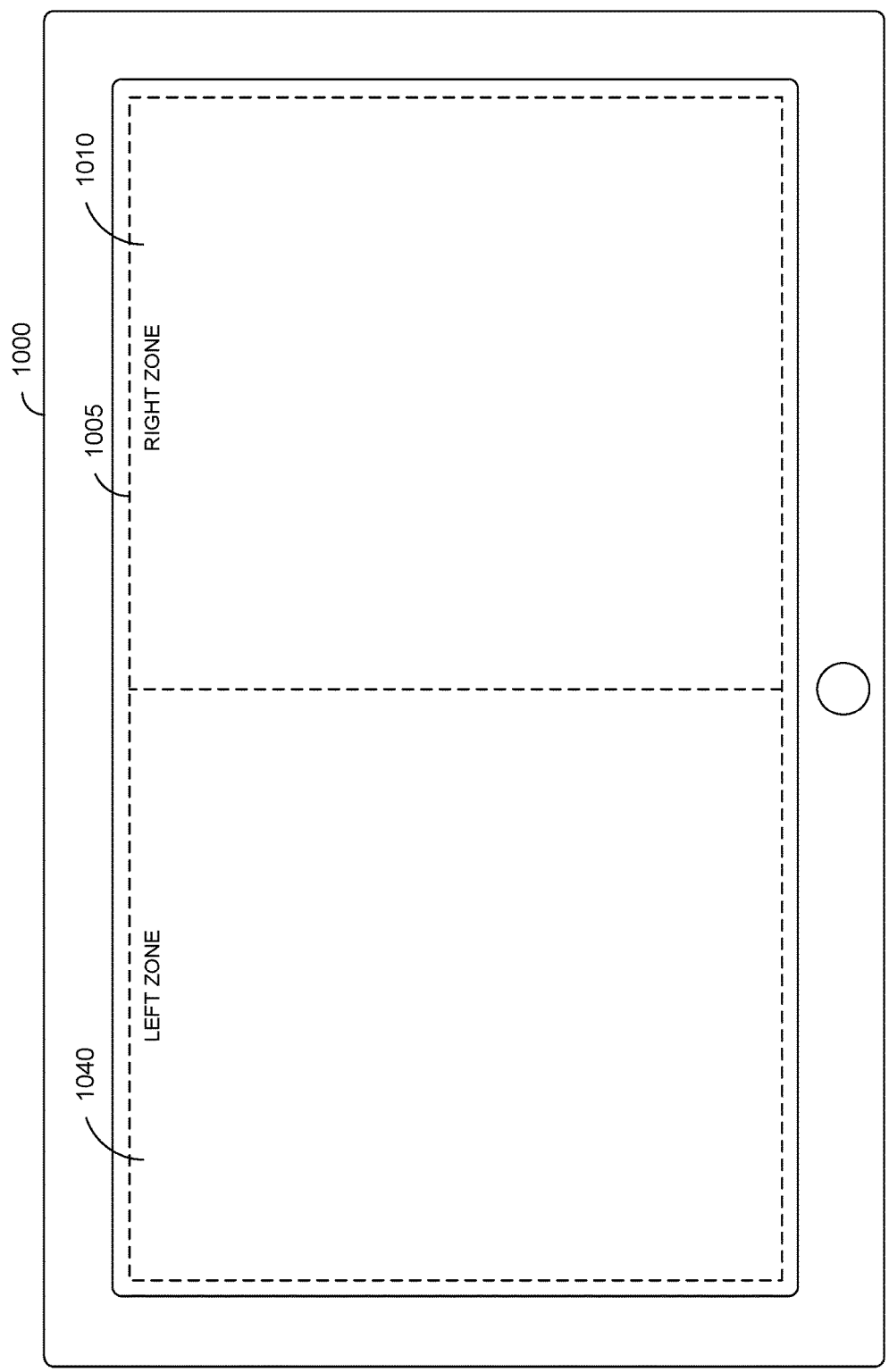
FIG. 10 is a diagram of a touchscreen interface illustrating dual input areas, in accordance with an aspect of the technology described herein.

Turning now to FIG. 10, a directional input interface 1005 is shown on a touchscreen device 1000, in accordance with an aspect of the technology described herein. As mentioned, the dual input multiplayer keyboard can receive input from a touchscreen device. In one aspect, a first layer is of the keyboard can be mapped to input from one portion of the screen and the second layer to a different portion. For example, the right half of the screen could map to the first layer and the left half to the second layer. The directional input interface 1005 is divided into a right zone 1010 and a left zone 1040. Generally, control surface within the right zone 1010 can be touched with the user's right hand. The control surface in the left zone 1040 can be touched with the user's left hand. The user's hands are not shown, but the user could be holding the device or the device could be resting on a surface.

Figure 11:
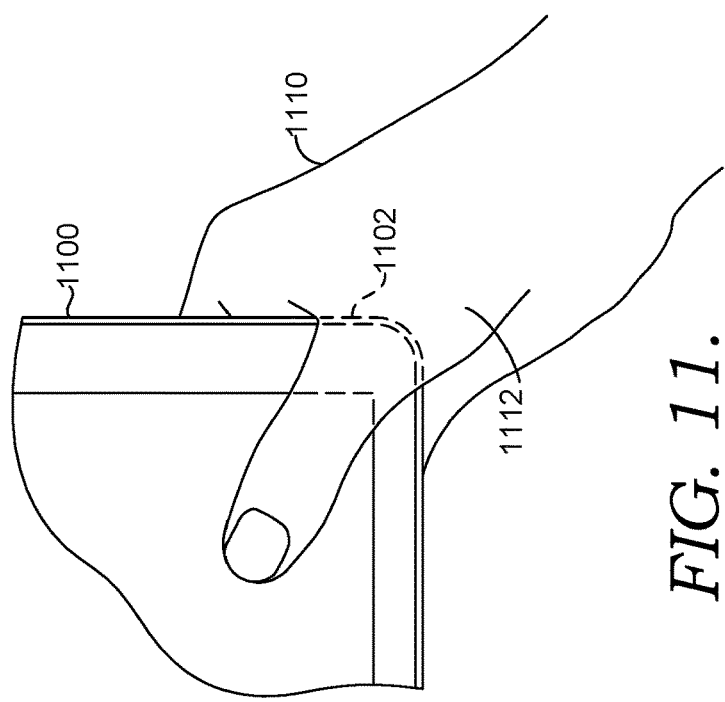
FIG. 11 is a diagram of an exemplary hand position suitable to manipulate a dual input keyboard on a touchscreen device, in accordance with an aspect of the technology described herein.

Turning now to FIG. 11, an exemplary hand position suitable to manipulate a dual input multilayer keyboard on a touchscreen device 1100 is shown, in accordance with an aspect of the technology described herein. A user holds the bottom corner 1102 of touchscreen device 1100 with her right hand 1110. The touchscreen device 1100 fits snugly in the crotch between her thumb 1112 and forefinger. This position allows the user to provide a directional input in the lower-right-hand side of the touchscreen device 1100. The user could hold the left side of the touchscreen device 1100 in a similar manner.

Figure 12:
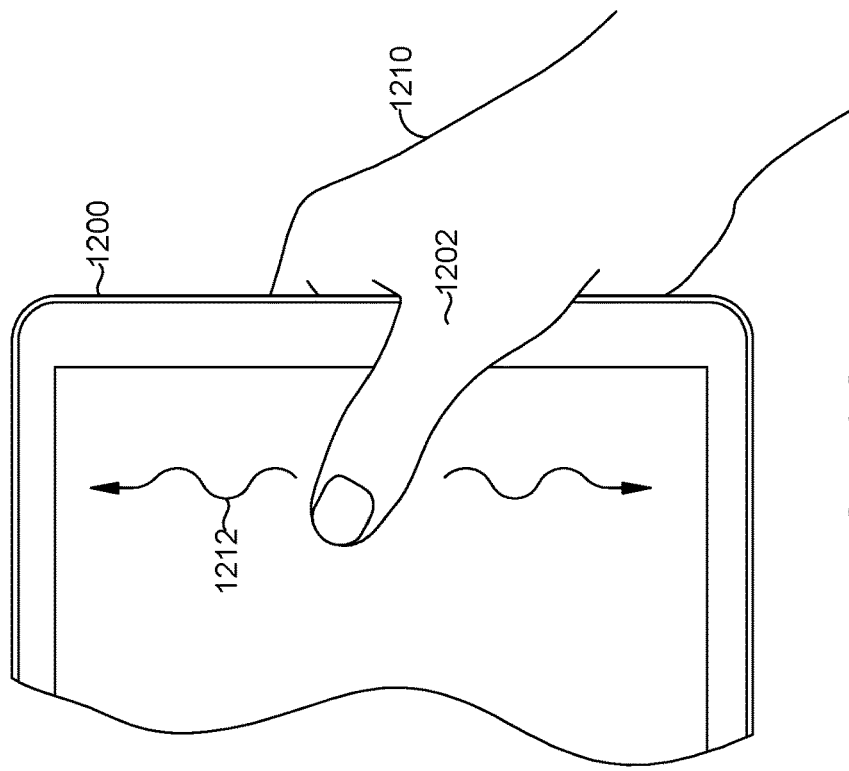
FIG. 12 is a diagram of an exemplary hand position suitable to manipulate a dual input keyboard on a touchscreen device, in accordance with an aspect of the technology described herein.

Turning now to FIG. 12, an exemplary hand position suitable for use with a dual input multilayer keyboard on a touchscreen device 1200 is shown, in accordance with an aspect of the technology described herein. The user holds the right side of touchscreen device 1200 in the crotch formed by his thumb 1202 and forefinger of his right hand 1210. In this position, the user can slide 1212 his thumb 1202 up and down the touchscreen to provide directional input. Notice that the directional input does not need to start or stop at a particular point on the screen. The user could start each swipe input at a different point. For example, the user could swipe from point A to point B and then perform a swipe from point B to point C. So long as the swipe is in the correct portion of the screen, it may not matter where it starts. This allows the user to swipe without looking at the touchscreen. The user could hold the left side of the touchscreen device 1100 in a similar manner as illustrated above.

Other hand positions are possible. For example, the user could lay a touchscreen device on a surface and use multiple fingers to interact with the virtual control interface.

Figure 13:
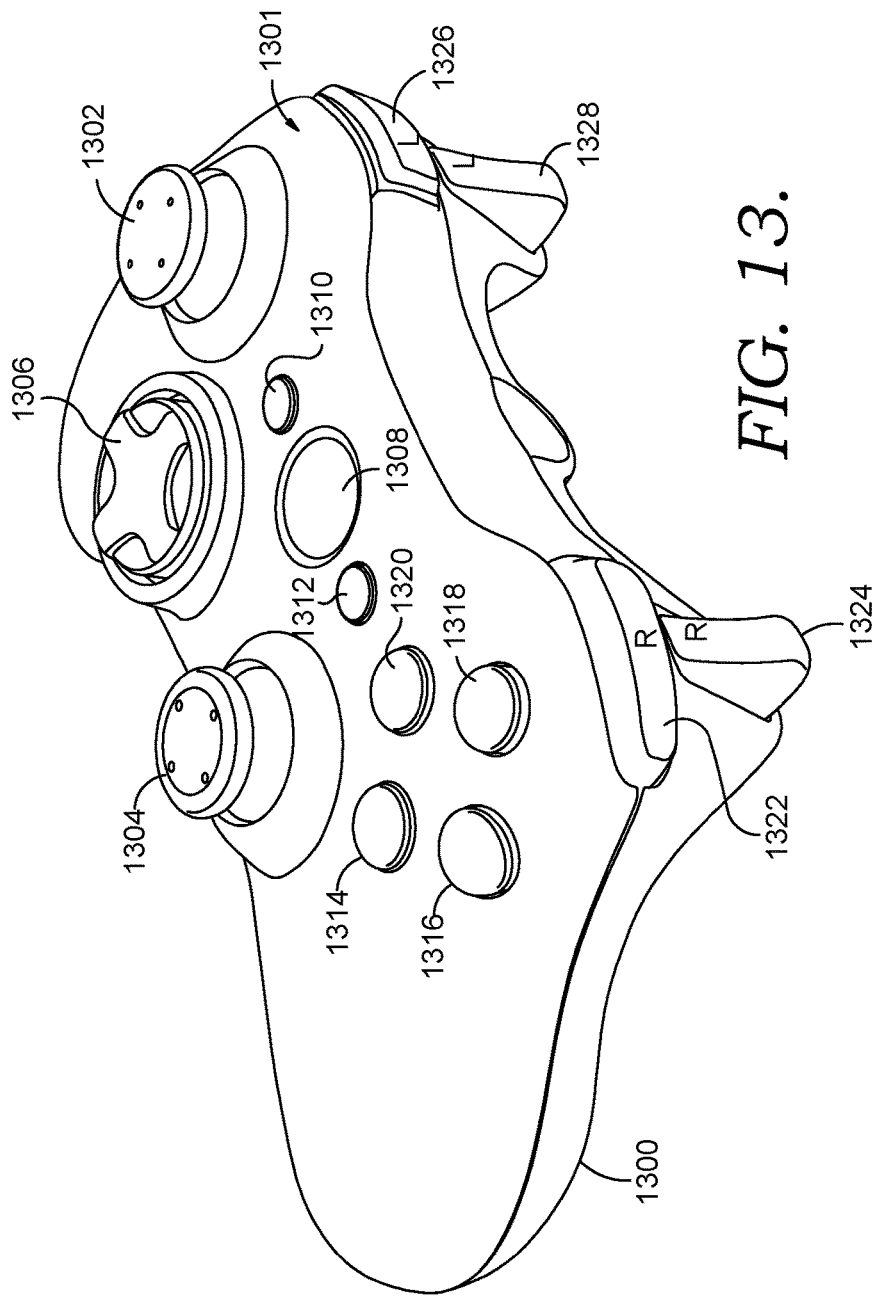
FIG. 13 is a diagram of a standard gamepad, in accordance with an aspect of the technology described herein.

Turning now to FIG. 13, gamepad controls on standard gamepad 1300 are shown. Any control on a gamepad may be described as a gamepad control herein. The gamepad 1300 comprises several gamepad controls, including a left stick 1302 and a right stick 1304. Gamepad controls on the top side 1301 of gamepad 1300 include a direction pad 1306, a guide button 1308, a back button 1310, a start button 1312, and face buttons 1314, 1316, 1318, and 1320. Other gamepad controls on the gamepad 1300 are a right bumper 1322 and a right trigger 1324. The gamepad 1300 also includes a left bumper 1326 and a left trigger 1328.

The gamepad 1300 is ergonomically designed to be held by both the user's right and left hand. The left hand may control the left stick 1302 along with the left bumper 1326 and the left trigger 1328. A user may prefer to control the left stick 1302 with his left thumb, the left bumper 1326 with his left index finger, and the left trigger 1328 with his left middle finger. The right hand may control the right stick 1304 along with the right bumper 1322 and the right trigger 1324. A user may prefer to control the right stick 1304 with his right thumb, the right bumper 1322 with his right index finger, and the right trigger 1324 with his right middle finger. The face buttons 1314, 1316, 1318, and 1320 may also be controlled by the user's right hand.

The different controls on the gamepad 1300 control different features of a game. For example, moving the left stick 1302 may translate a player through the game while the right stick 1304 rotates the layer. Game developers can establish each button's function in a game.

As used herein, the phrase "activating a gamepad control" means interacting with a gamepad control to cause a functional instruction to be communicated from the gamepad 1300. For example, pushing a reference button is an example of activating a gamepad control. In response to pushing a reference button, the gamepad generates a functional instruction that is communicated to the gaming device. The gaming device interprets the functional instruction as a push of the reference button. This instruction may be fed to a video game title and the game manipulated according to the consequence of pushing the reference button. Moving a stick is another example of activating a gamepad control. Holding a stick or a button in a particular position or state may cause multiple functional instructions to be generated by the gamepad.

Figure 14:
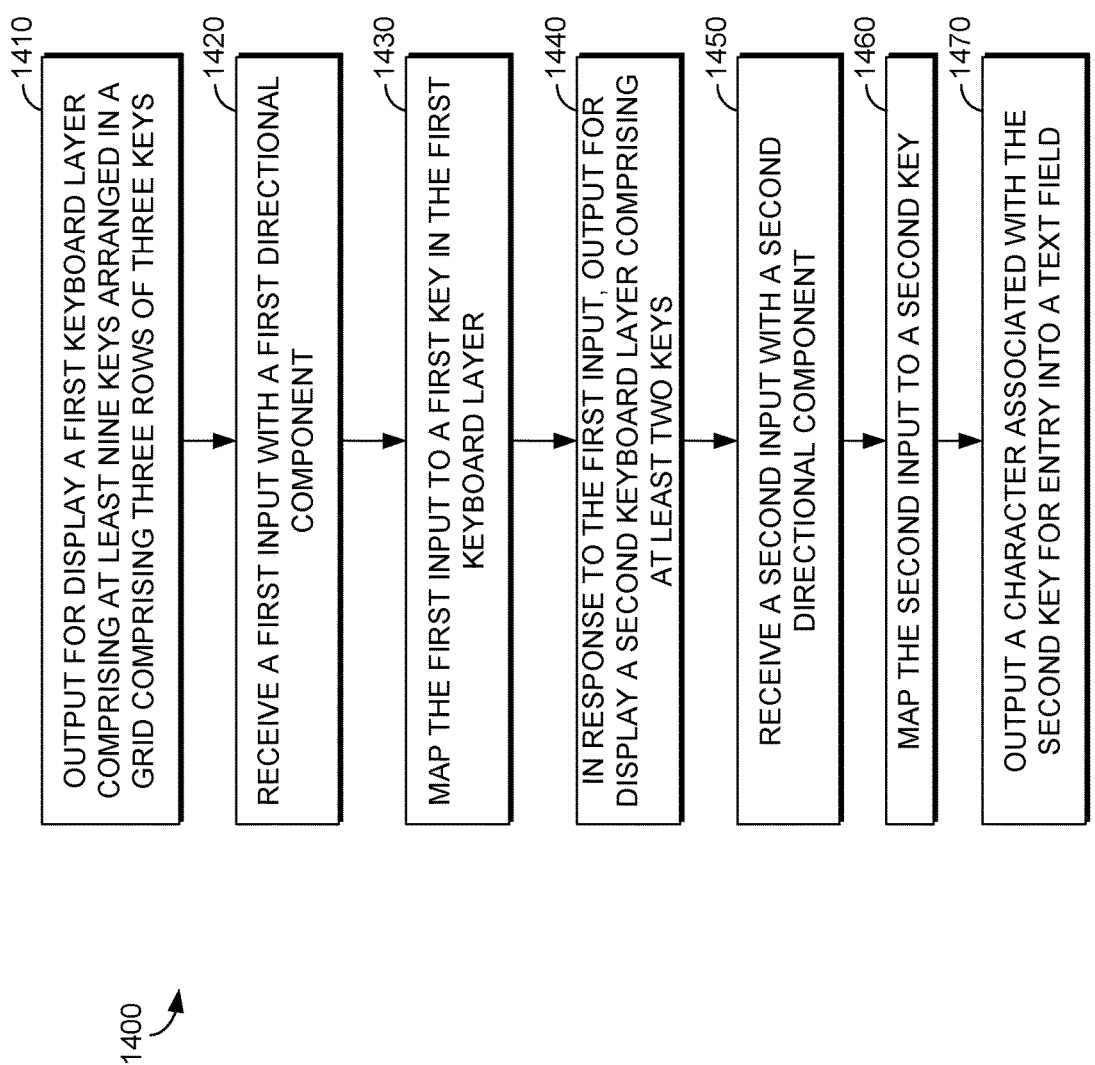
FIG. 14 is a flow chart showing a method for using a dual input keyboard, in accordance with an aspect of the technology described herein.

Turning now to FIG. 14, a flow chart showing a method 1400 for operating a dual input multilayer keyboard is provided. Method 1400 may be performed by a client device, such as a smart phone, tablet, e-reader, desktop computer, laptop computer, smart television, virtual reality glasses, augmented reality glasses, a game console, a DVD player, a DVR, an entertainment streaming device, and other computing devices.

At step 1410, a first keyboard layer comprising at least nine keys arranged in a grid comprising three rows of three keys is output for display. Each of the nine keys may depict one or more characters that are selectable through a second layer that is activated upon selection of a key in the first layer.

At step 1420, a first input comprising a first directional component is received. The input may be provided through a touchscreen, a gamepad, a mouse, a trackball, a gesture detected by a camera, or through some other mechanism. The input may have more than just a directional component, but it must have a directional component. For example, a touch input can have a velocity component, pressure component, acceleration component, width, and other components. In an aspect, the other components of the input can be ignored in the directional component used to define the input.

At step 1430, the first input is mapped to a first key in the first keyboard layer. The mapping can occur by analyzing the directional component of the input. Keys may have an input definition comprising a range of directional inputs. The range may be defined in vector space. An input having a directional vector with X and Y dimensions within the range associated with the key is able to be mapped to that key. Each key has a unique range. In an aspect, the center key in the center row may be associated with a directional component of zero or substantially zero. For example, a tap may have no directional component.

At step 1440, in response to the first input, a second keyboard layer comprising at least two keys is output for display. As mentioned, each key in the first layer can be associated with a unique second keyboard layer. In other words, each of the nine keys in the first layer activates one of nine unique second layers. The second layer may also comprise a 3×3 grid of keys. Each key is associated with a single character which may be displayed on the key.

At step 1450, a second input comprising a second directional component is received. As with the first input, the second input may be provided through a touchscreen, a gamepad, a mouse, a trackball, a gesture detected by a camera, or through some other mechanism. The input may have more than just a directional component, but it must have a directional component. For example, a touch input can have a velocity component, pressure component, acceleration component, width, and other components. In an aspect, the other components of the input can be ignored in the directional component used to define the input. In one aspect, the first and second inputs are not made from the same interface component, though they may be provided from the same device. For example, the first input may be from a right joy stick and a second input from a left joy stick on a gamepad or vice versa.

Different portions of a touchscreen device can comprise a different interface component, as interface component is used herein. For example, the first input is made on a right-hand side of a touchscreen device and the second input is made on the left-hand side or vice versa. In another example, the first input is made on a top portion of a touchscreen device and the second input is made on the bottom portion or vice versa.

At step 1460, the second input is mapped to a second key. As with the first layer, each key is associated with a directional definition. The directional definition may comprise a range of vectors. A directional input matching the directional definition causes the directional input to be mapped to the key associated with the directional definition.

At step 1470, a character associated with the second key is output for entry into a text field. As mentioned, each key in the second layer is associated with a single character. Upon selection of a key via the second input, the character is input into the active text field as with other keyboards. For example, the active text field could be a document, text application, email application, social media application, Web browser, spreadsheet, search box, or other interface capable of receiving text.

Figure 15:
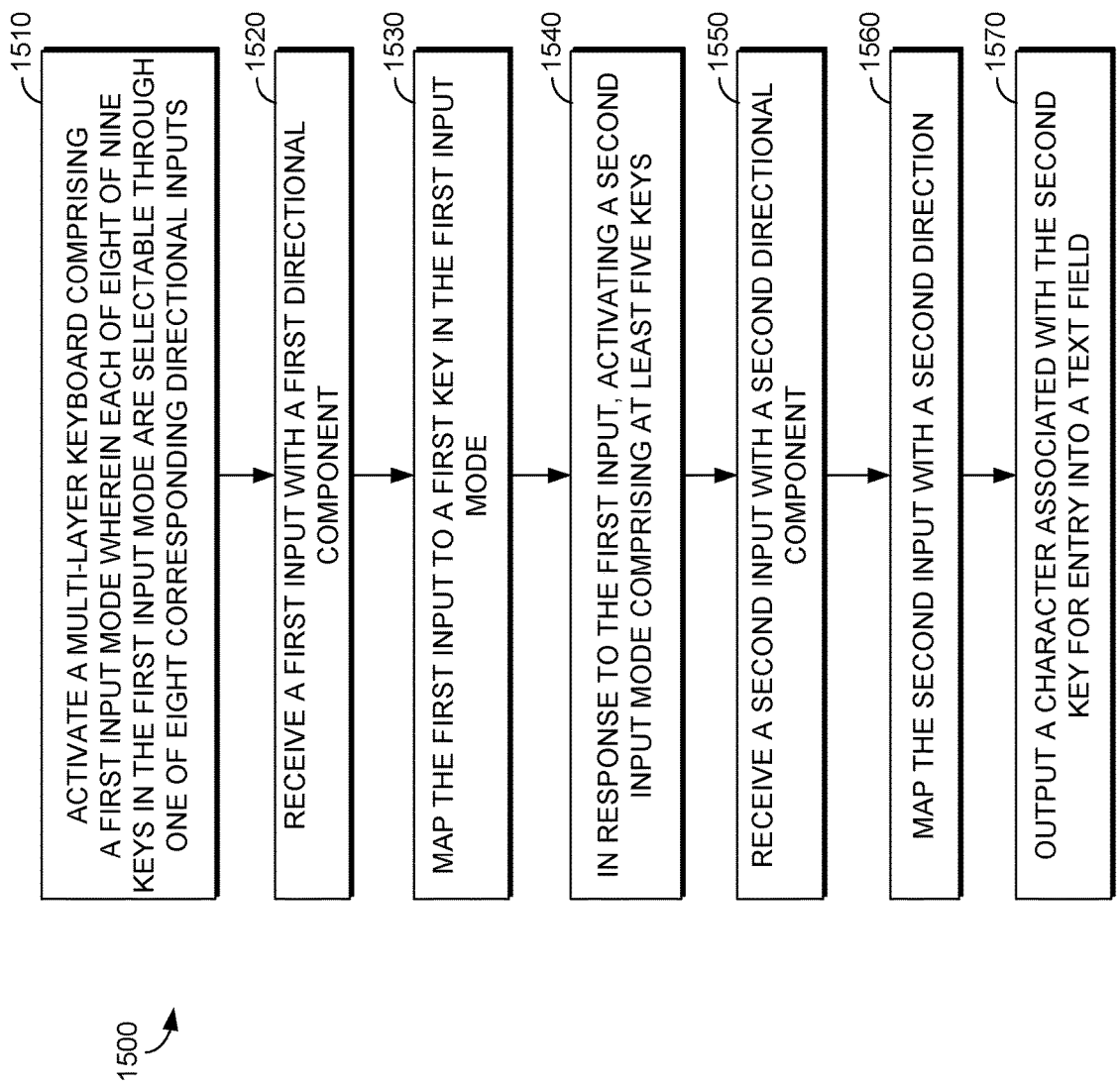
FIG. 15 is a flow chart showing a method for using a dual input keyboard, in accordance with an aspect of the technology described herein.

Turning now to FIG. 15, a flow chart showing a method 1500 for operating a dual input keyboard is provided. Method 1500 may be performed by a client device, such as a smart phone, tablet, e-reader, desktop computer, laptop computer, smart television, virtual reality glasses, augmented reality glasses, a game console, a DVD player, a DVR, an entertainment streaming device, and other computing devices.

At step 1510, a multilayer keyboard comprising a first input mode wherein each of eight of nine keys in the first input mode are selectable through one of eight corresponding directional inputs is activated. Each of the keys may depict one or more characters that are selectable through a second layer that is activated upon selection of a key in the first layer. In one aspect, each key to fix multiple characters that may be selected via a second layer associated with the key. It may not be necessary for every character selectable from the second layer to be displayed on the key that accesses the layer. In one aspect, the keys in the first input mode are not output for display. As mentioned, in one aspect the user does not contact a selected key while swiping a touchscreen, even when the keyboard is displayed on the touchscreen. The input is the directional character of the swipe, not where on a touchscreen the swipe starts or stops. Different swipes selecting the same key can start and stop at different places on the screen.

At step 1520, a first input with a first directional component is received. The input may be provided through a touchscreen, a gamepad, a mouse, a trackball, a gesture detected by a camera, or through some other mechanism. The input may have more than just a directional component, but it must have a directional component. For example, a touch input can have a velocity component, pressure component, acceleration component, width, and other components. In an aspect, the other components of the input can be ignored in the directional component used to define the input.

At step 1530, the first input is mapped to a first key in the first input mode. The mapping can occur by analyzing the directional component of the input. Keys may have an input definition comprising a range of directional inputs. The range may be defined in vector space. An input having a directional vector with X and Y dimensions within the vector range associated with the key is able to be mapped to that key. Each key may have a unique range. In an aspect, the center key in the center row may be associated with a directional component of zero or substantially zero. For example, a tap may have no directional component.

At step 1540, in response to the first input, a second input mode comprising at least five keys is activated. As mentioned, each key in the first mode can be associated with a unique second keyboard mode. In other words, each of the keys in the first mode activates one of nine unique second modes. The second mode may comprise a 3×3 grid of keys. Each key is associated with a single character, which may or may not be displayed. In one aspect, supplemental rows or columns may be added to the 3×3 grid.

At step 1550, a second input with a second directional component is received. As with the first input, the second input may be provided through a touchscreen, a gamepad, a mouse, a trackball, a gesture detected by a camera, or through some other mechanism. The input may have more than just a directional component, but it must have a directional component. For example, a touch input can have a velocity component, pressure component, acceleration component, width, and other components. In an aspect, the other components of the input can be ignored in the directional component used to define the input. In one aspect, the first and second inputs are not made from the same interface component, though they may be provided from the same device. For example, the first input may be from a right joy stick and a second input from a left joy stick on a gamepad or vice versa.

Different portions of a touchscreen device can comprise a different interface component, as interface component is used herein. For example, the first input is made on a right-hand side of a touchscreen device and the second input is made on the left-hand side or vice versa. In another example, the first input is made on a top portion of a touchscreen device and the second input is made on the bottom portion or vice versa. As mentioned, in one aspect the user does not contact a selected key while swiping a touchscreen. The input is the directional character of the swipe, not where on a touchscreen the swipe starts or stops. Different swipes selecting the same key can start and stop at different places on the screen. In other words, the starting point or stopping point of a swipe is not used to map the swipe to a key. The swipe also does not need to intersect a key the swipe is mapped to.

At step 1560, the second input is mapped to a second key. As with the first mode, each key is associated with a directional definition. The directional definition may comprise a range of vectors. A directional input matching the directional definition causes the directional input to be mapped to the key associated with the directional definition.

At step 1570, a character associated with the second key is output for entry into a text field. As mentioned, each key in the second layer is associated with a single character. Upon selection of a key via the second input, the character is input into the active text field as with other keyboards. For example, the active text field could be a document, text application, email application, social media application, Web browser, spreadsheet, search box, or other interface capable of receiving text.

Figure 16:
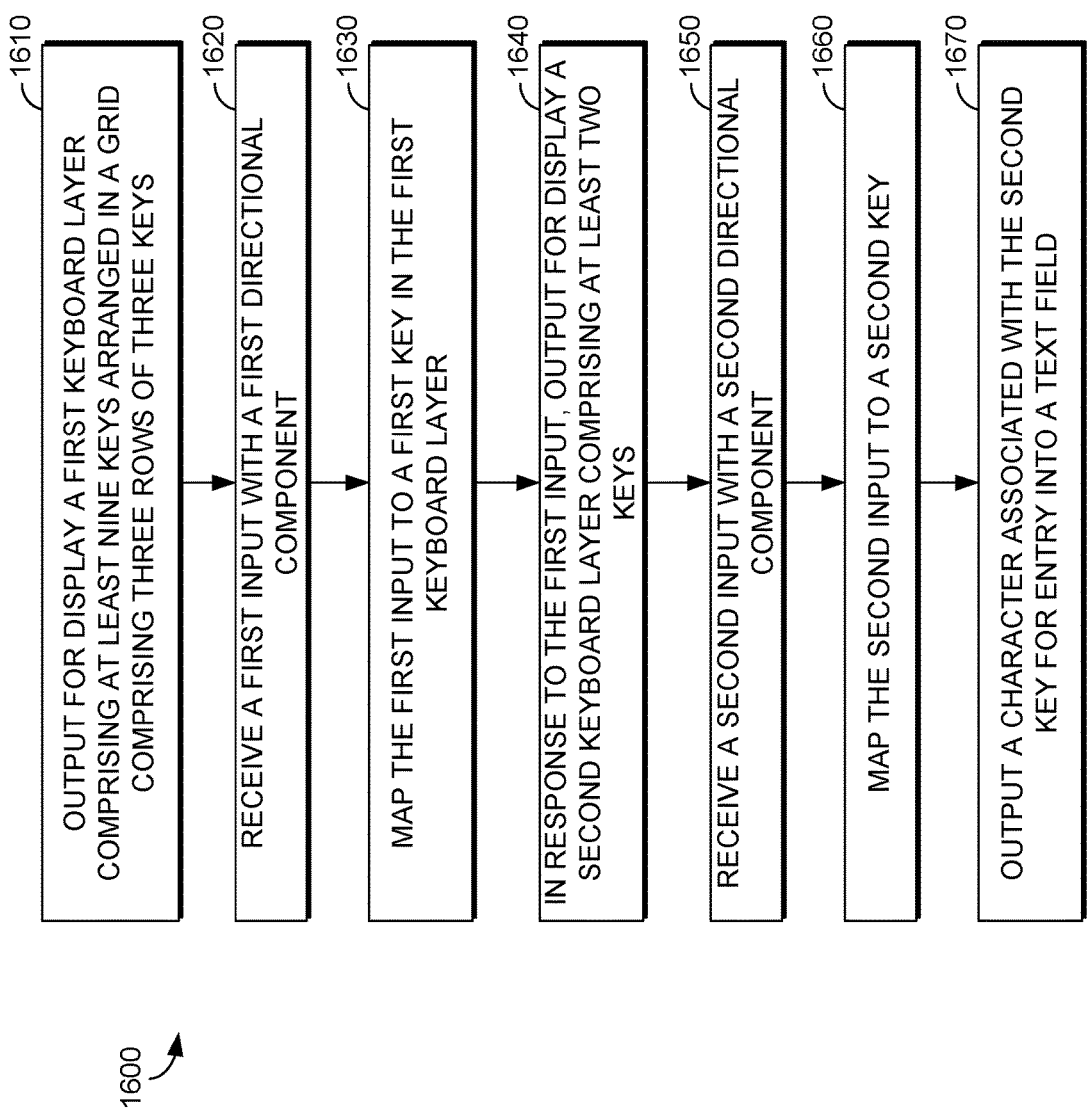
FIG. 16 is a flow chart showing a method of using dual input keyboard, in accordance with an aspect of the technology described herein.

Turning now to FIG. 16, a flow chart showing a method 1600 for operating a dual input keyboard is provided. Method 1600 may be performed by a client device, such as a smart phone, tablet, e-reader, desktop computer, laptop computer, smart television, virtual reality glasses, augmented reality glasses, a game console, a DVD player, a DVR, an entertainment streaming device, and other computing devices.

At step 1610, a first keyboard layer comprising at least nine keys arranged in a grid comprising three rows of three keys is output for display. Each of the nine keys may depict one or more characters that are selectable through a second layer that is activated upon selection of a key in the first layer.

At step 1620, a first input with a first directional component is received. The input may be provided through a touchscreen, a gamepad, a mouse, a trackball, a gesture detected by a camera, or through some other mechanism. The input may have more than just a directional component, but it must have a directional component. For example, a touch input can have a velocity component, pressure component, acceleration component, width, and other components. In an aspect, the other components of the input can be ignored in the directional component used to define the input.

At step 1630, the first input is mapped to a first key in the first keyboard layer. The mapping can occur by analyzing the directional component of the input. Keys may have an input definition comprising a range of directional inputs. The range may be defined in vector space. An input having a directional vector with X and Y dimensions within the vector range associated with the key is able to be mapped to that key. Each key may have a unique range. In an aspect, the center key in the center row may be associated with a directional component of zero or substantially zero. For example, a tap may have no directional component.

At step 1640, in response to the first input, a second keyboard layer comprising at least two keys is output for display. As mentioned, each key in the first layer can be associated with a unique second keyboard layer. In other words, each of the nine keys in the first layer activates one of nine unique second layers. The second layer may also comprise a 3×3 grid of keys. Each key is associated with a single character which may be displayed on the key.

At step 1650, a second input with a second directional component is received. As with the first input, the second input may be provided through a touchscreen, a gamepad, a mouse, a trackball, a gesture detected by a camera, or through some other mechanism. The input may have more than just a directional component, but it must have a directional component. For example, a touch input can have a velocity component, pressure component, acceleration component, width, and other components. In an aspect, the other components of the input can be ignored in the directional component used to define the input. In one aspect, the first and second inputs are not made from the same interface component, though they may be provided from the same device. For example, the first input may be from a right joy stick and a second input from a left joy stick on a gamepad or vice versa.

Different portions of a touchscreen device can comprise a different interface component, as interface component is used herein. For example, the first input is made on a right-hand side of a touchscreen device and the second input is made on the left-hand side or vice versa. In another example, the first input is made on a top portion of a touchscreen device and the second input is made on the bottom portion or vice versa.

At step 1660, the second input is mapped to a second key. As with the first layer, each key is associated with a directional definition. The directional definition may comprise a range of vectors. A directional input matching the directional definition causes the directional input to be mapped to the key associated with the directional definition.

At step 1670, a character associated with the second key is output for entry into a text field. As mentioned, each key in the second layer is associated with a single character. Upon selection of a key via the second input, the character is input into the active text field as with other keyboards. For example, the active text field could be a document, text application, email application, social media application, Web browser, spreadsheet, search box, or other interface capable of receiving text.

Aspects of the technology described herein have been described to be illustrative rather than restrictive. It will be understood that certain features and subcombinations are of utility and may be employed without reference to other features and subcombinations. This is contemplated by and is within the scope of the claims.

The invention claimed is:

1. One or more computer-storage media having computer-executable instructions embodied thereon that when executed by a computing device perform a method for operating a dual input keyboard, the method comprising:
outputting for display a first keyboard layer comprising at least nine keys arranged in a grid comprising three rows of three keys;
receiving a first input comprising a first directional component;
mapping the first input to a first key in the first keyboard layer;
in response to the first input, outputting for display a second keyboard layer comprising at least two keys;
receiving a second input comprising a second directional component, wherein the first input is received from a first side of a touchscreen on a user device and the second input is received from a second side of the touchscreen on the user device, wherein the first side is opposite the second side;
mapping the second input to a second key; and
outputting a character associated with the second key for entry into a text field.

2. The media of claim 1, wherein the first input is received from a first joy stick on a gamepad and the second input is received from a second joy stick on the gamepad.

3. The media of claim 1, wherein the first side is a left-hand side of the touchscreen from a user's perspective and the second side is the right-hand side of the touchscreen from the user's perspective.

4. The media of claim 1, wherein the first input is a swipe on a touchscreen that does not intersect the first key.

5. The media of claim 1, wherein the first direction is a vector with a down-to-up component and a left-to-right component and the first key is located in a right most location in a top row of the three rows.

6. The media of claim 1, wherein the first nine keys correspond to consonant sounds and the first key is an individual consonant sound and the second keyboard layer comprises characters corresponding to the individual consonant combined with one of several available vowel sounds.

7. A method for operating a dual input keyboard, the method comprising:
activating a multilayer keyboard comprising a first input mode wherein each of eight of nine keys in the first input mode are selectable through one of eight corresponding directional inputs;
receiving a first input with a first directional component;
mapping the first input to a first key in the first input mode;
in response to the first input, activating a second input mode comprising at least five keys;
receiving a second input with a second directional component, wherein the first input is received through a first input device and the second input is received through a second input device;
mapping the second input to a second key; and
outputting a character associated with the second key for entry into a text field.

8. The method of claim 7, wherein the first input device is a first joy stick on a gamepad and the second input device is a second joy stick on the gamepad.

9. The method of claim 7, wherein the first input device is a first side of a touchscreen on a user device and the second input device is a second side of the touchscreen on the user device, wherein the first side is opposite the second side.

10. The method of claim 7, wherein the multilayer keyboard is not output for display to a user providing the first input and the second input.

11. The method of claim 7, wherein the nine keys correspond to consonant sounds and the first key is an individual consonant sound and the second input mode comprises five characters each corresponding to one of five vowel sounds.

12. The method of claim 7, wherein a ninth key is selected by receiving a tap input.

13. The method of claim 7, wherein the first input is a swipe on a touchscreen, wherein the swipe does not rely on a designated starting point or stopping point to map to the first key.

14. One or more computer-storage media having computer-executable instructions which are not signal per se embodied thereon that when executed by a computing device perform a method for operating a dual input keyboard, the method comprising:
outputting for display a first keyboard layer comprising at least nine keys arranged in a grid comprising three rows of three keys;
receiving a first input with a first directional component;
mapping the first input to a first key in the first keyboard layer;
in response to the first input, outputting for display a second keyboard layer comprising at least two keys;
receiving a second input with a second directional component wherein the first input is received through a first interface and the second input is received through a second input interface;
mapping the second input to a second key; and
outputting a character associated with the second key for entry into a text field.

15. The media of claim 14, wherein the first interface is a first side of a touchscreen on a user device and the second interface is a second side of the touchscreen on the user device, wherein the first side is opposite the second side.

16. The media of claim 15, wherein the first directional control does not overlap an area where the first keyboard layer is displayed.

17. The media of claim 14, wherein the first direction is a vector with a down-to-up component and left-to-right component and the first key is located in a right most location in a top row of the three rows.

18. The media of claim 14, wherein the first input is received from a first joy stick on a gampad and the second input is received from a second joy stick on the gamepad.

19. The media of claim 14, wherein the first input is a swipe on a touchscreen that does not intersect the first key.

20. The media of claim 14, wherein the first nine keys correspond to consonant sounds and the first key is an individual consonant sound and the and keyboard layer comprises characters corresponding to the individual consonant combined with one of several available vowel sounds.

* * * * *